(12) United States Patent
Johnston, VII

(10) Patent No.: US 10,793,201 B1
(45) Date of Patent: Oct. 6, 2020

(54) PICKUP TRUCK CARGO BOX SUBASSEMBLY

(71) Applicant: Aerlyte, Inc., Petoskey, MI (US)

(72) Inventor: Christopher Johnston, VII, Petoskey, MI (US)

(73) Assignee: Aerlyte, Inc., Petoskey, MI (US)

( * ) Notice: Subject to any disclaimer, the term of this patent is extended or adjusted under 35 U.S.C. 154(b) by 0 days.

(21) Appl. No.: 16/794,579

(22) Filed: Feb. 19, 2020

(51) Int. Cl.
*B62D 33/023* (2006.01)
*B62D 33/077* (2006.01)
*B32B 3/12* (2006.01)
*B62D 29/04* (2006.01)

(52) U.S. Cl.
CPC .............. *B62D 33/023* (2013.01); *B32B 3/12* (2013.01); *B62D 29/043* (2013.01); *B62D 33/077* (2013.01); *B32B 2250/40* (2013.01); *B32B 2605/00* (2013.01)

(58) Field of Classification Search
CPC .. B62D 33/023; B62D 29/043; B62D 33/077; B62D 25/10; B32B 3/12; B32B 2250/40; B32B 2605/00
USPC ...................................................... 296/186.1
See application file for complete search history.

(56) References Cited

U.S. PATENT DOCUMENTS

| | | | |
|---|---|---|---|
| 5,172,953 A | 12/1992 | Chamberlain | |
| 5,269,574 A | 12/1993 | Bhutani et al. | |
| 5,370,436 A | 12/1994 | Martindale et al. | |
| 5,660,427 A * | 8/1997 | Freeman | B62D 29/001 296/183.1 |
| 6,676,187 B1 * | 1/2004 | Miskech | B62D 33/0273 296/146.8 |
| 6,814,397 B2 * | 11/2004 | Henderson | B62D 33/02 296/181.3 |
| 6,843,525 B2 | 1/2005 | Preisler | |
| 6,945,591 B2 * | 9/2005 | Durand | B60R 13/01 296/181.3 |
| 7,575,264 B1 * | 8/2009 | Solomon | B60P 7/0815 296/183.1 |
| 8,764,089 B2 * | 7/2014 | Preisler | B60R 13/0237 296/39.3 |
| 8,795,807 B2 | 8/2014 | Preisler et al. | |
| 8,808,827 B2 | 8/2014 | Preisler et al. | |
| 8,808,828 B2 | 8/2014 | Preisler et al. | |
| 8,808,829 B2 | 8/2014 | Preisler et al. | |
| 8,808,830 B2 | 8/2014 | Preisler et al. | |
| 8,808,831 B2 | 8/2014 | Preisler et al. | |

(Continued)

*Primary Examiner* — Pinel E Romain
(74) *Attorney, Agent, or Firm* — Brooks Kushman P.C.

(57) ABSTRACT

A pickup truck cargo box subassembly includes a load floor composed of a sandwich structure having an upper skin, a lower skin and a core extending therebetween. The upper skin is formed of a composite material including continuous reinforcing fibers. The pickup truck cargo box subassembly also includes a left inner sidewall panel having an integrated left inner sidewall panel joining surface extending horizontally along at least a portion of a length of the left inner sidewall panel. The pickup truck cargo box subassembly also includes a right inner sidewall panel having an integral right inner sidewall panel joining surface extending horizontally along at least a portion of a length of the right inner sidewall panel. The left and right inner sidewall panel joining surfaces join a peripheral portion of the load floor. The pickup truck cargo box subassembly also includes a headboard and a rear cross sill.

33 Claims, 13 Drawing Sheets

(56) References Cited

U.S. PATENT DOCUMENTS

| | | | |
|---|---|---|---|
| 8,808,833 B2 | 8/2014 | Preisler et al. | |
| 8,808,834 B2 | 8/2014 | Preisler et al. | |
| 8,859,074 B2 | 10/2014 | Preisler et al. | |
| 9,120,510 B1 * | 9/2015 | Gillam | B62D 25/10 |
| 9,604,677 B2 | 3/2017 | McKinney et al. | |
| 9,757,825 B2 | 9/2017 | Courtright et al. | |
| 10,112,656 B2 | 10/2018 | McKinney et al. | |
| 10,150,515 B1 * | 12/2018 | Stojkovic | B62D 25/2072 |
| 2009/0095206 A1 * | 4/2009 | Dacus | B32B 3/12 |
| | | | 108/57.27 |
| 2010/0119768 A1 | 5/2010 | Simon et al. | |
| 2017/0129145 A1 * | 5/2017 | Wang | B32B 5/02 |
| 2018/0118280 A1 | 5/2018 | Marchlewski et al. | |
| 2019/0071135 A1 * | 3/2019 | Fenton | B62D 33/046 |

\* cited by examiner

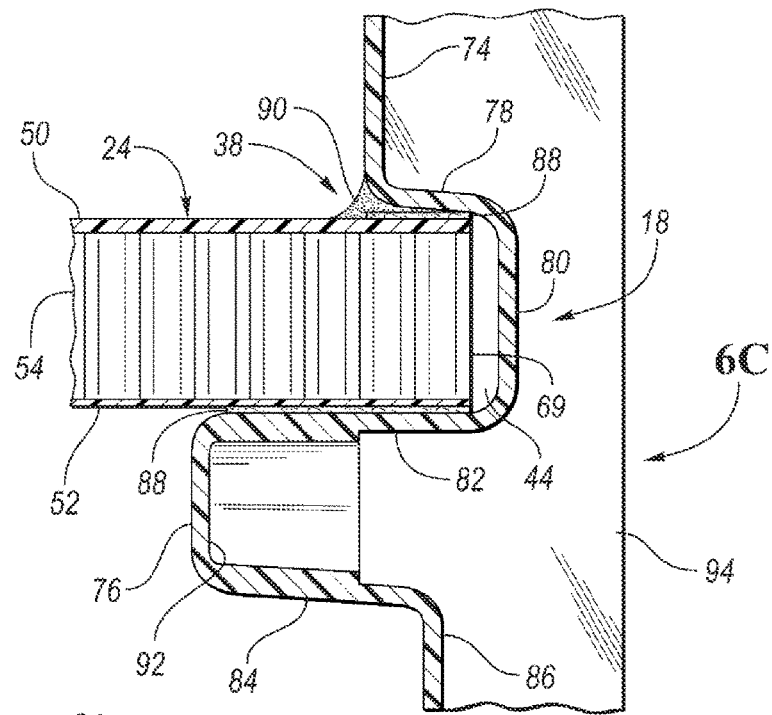
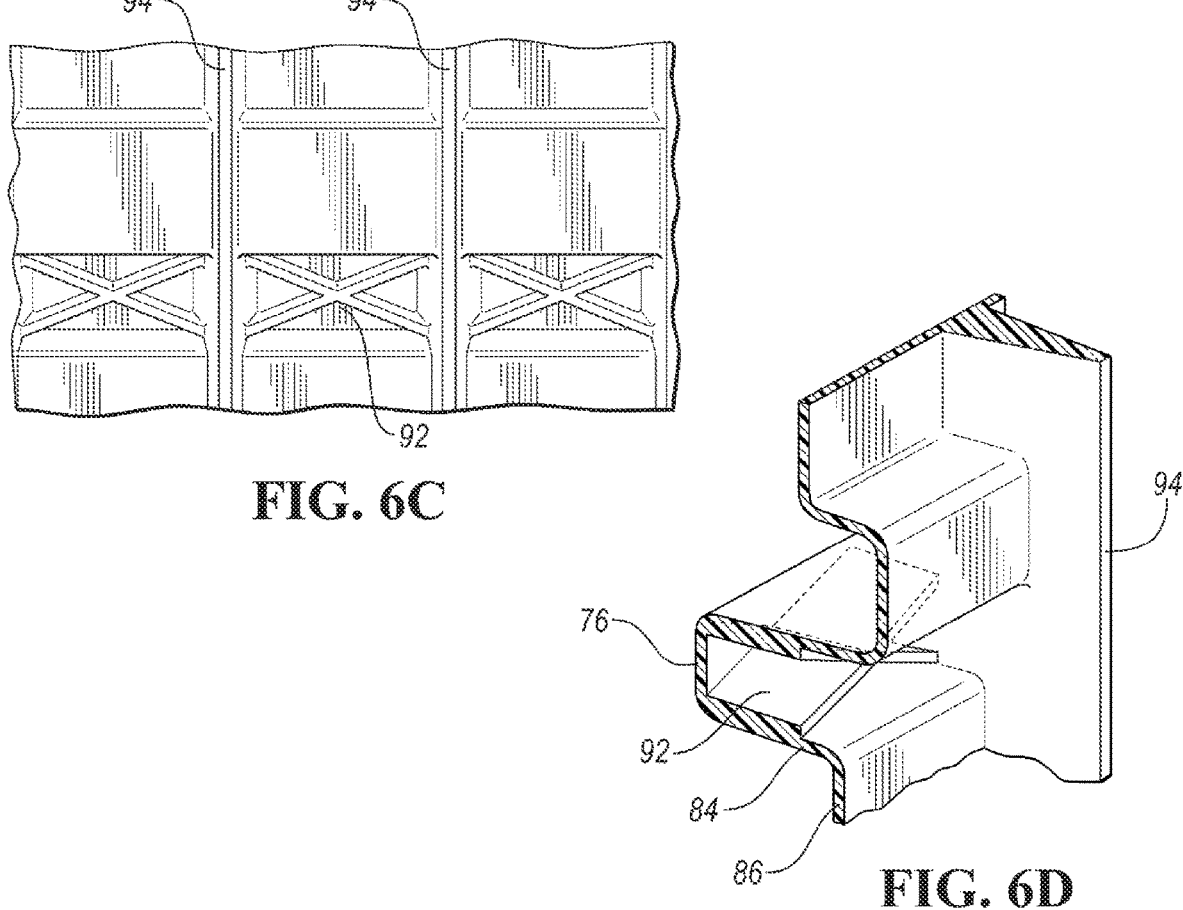
FIG. 6B
FIG. 6C
FIG. 6D

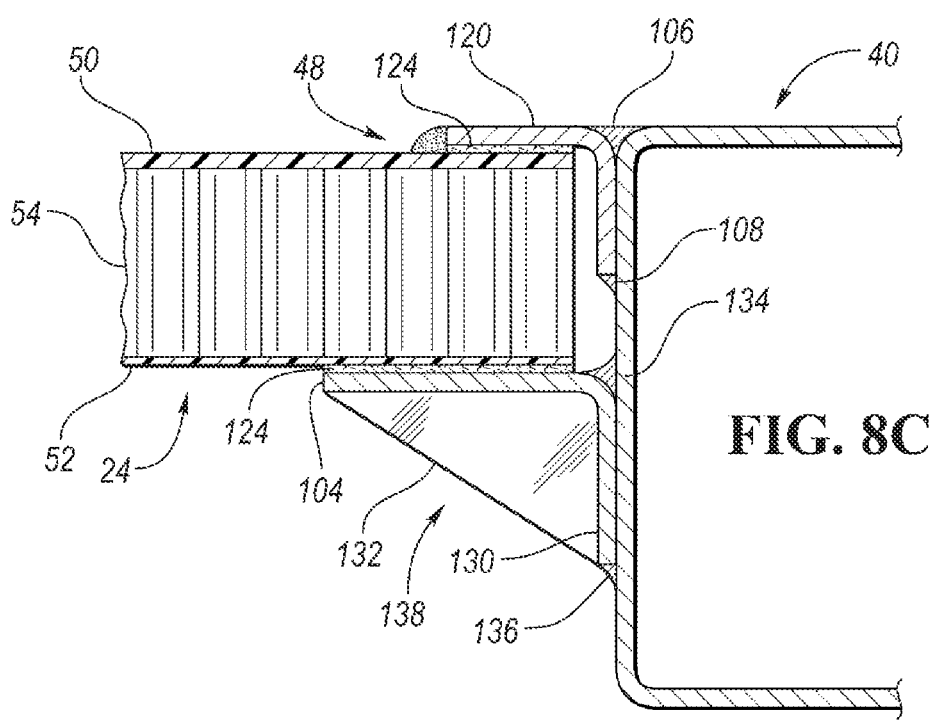

PICKUP TRUCK CARGO BOX SUBASSEMBLY

TECHNICAL FIELD

The present disclosure relates to a pickup truck cargo box subassembly including a load floor constructed of a sandwich material having an upper skin, a lower skin and a core extending therebetween, where the upper skin may be formed of composite material including continuous reinforcing fibers.

BACKGROUND

Pickup trucks are a type of motor vehicle. Pickup trucks typically include a passenger compartment in the front of the pickup truck and a cargo area in the rear of the pickup truck. The cargo area is typically bounded on four sides by left and right inner sidewall panels and a forward headboard, all of which are typically fixed in position relative to the cargo area, and a rearward tailgate that lowers to permit access to the cargo area and raises to contain cargo in the cargo area. Cargo is supported by a floor spanning the distance between the sidewalls, headboard, and tailgate. The floor is typically supported by a series of crossmembers and may be attached to a vehicle frame. A rear cross sill subassembly, which includes left and right D-pillars and a rear cross sill extending therebetween is used to support the open end of the cargo box, the inner sidewalls, the load floor, and the tailgate.

SUMMARY

In a first embodiment, a pickup truck cargo box subassembly is disclosed. The pickup truck cargo box subassembly includes a load floor composed of a sandwich structure having an upper skin, a lower skin and a core extending therebetween. The upper skin is formed of a composite material including continuous reinforcing fibers. The pickup truck cargo box subassembly also includes a left inner sidewall panel having a left inner sidewall panel joining surface extending horizontally along at least a portion of a length of the left inner sidewall panel and integrally formed with the left inner sidewall panel. The pickup truck cargo box subassembly also includes a right inner sidewall panel having a right inner sidewall panel joining surface extending horizontally along at least a portion of a length of the right inner sidewall panel and integrally formed with the right inner sidewall panel. The left and right inner sidewall panel joining surfaces join a peripheral portion of the load floor. The pickup truck cargo box subassembly also includes a headboard and a rear cross sill.

In a second embodiment, a pickup truck cargo box subassembly is disclosed. The pickup truck cargo box subassembly includes a load floor formed of a sandwich structure having an upper skin, a lower skin and a core extending therebetween. The upper skin is formed of a composite material including continuous glass and/or carbon reinforcing fibers. The pickup truck cargo box subassembly also includes a left inner sidewall panel having a left inner sidewall panel joining surface extending horizontally along at least a portion of a length of the left inner sidewall panel and integrally formed with the left inner sidewall panel. The pickup truck cargo box subassembly also includes a right inner sidewall panel having a right inner sidewall panel joining surface extending horizontally along at least a portion of a length of the right inner sidewall panel and integrally formed with the right inner sidewall panel. The left and right inner sidewall panel joining surfaces join a peripheral portion of the load floor. The pickup truck cargo box subassembly also includes a headboard and a rear cross sill.

In another embodiment, a pickup truck cargo box subassembly is disclosed. The pickup truck cargo box subassembly includes a load floor formed of a sandwich structure having an upper skin, a lower skin and a core extending therebetween. The upper skin is formed of a composite material including continuous reinforcing fibers. The pickup truck cargo box subassembly also includes a left inner sidewall panel having a left inner sidewall panel joining channel extending horizontally along at least a portion of a length of the left inner sidewall panel and integrally formed with the left inner sidewall panel. The pickup truck cargo box subassembly also includes a right inner sidewall panel having a right inner sidewall panel joining channel extending horizontally along at least a portion of a length of the right inner sidewall panel and integrally formed with the right inner sidewall panel. The left and right inner sidewall panel joining channels join a peripheral portion of the load floor and the sandwich structure optionally has one or more fasteners joining the sandwich structure to one or more components of the pickup truck cargo box subassembly. The pickup truck cargo box assembly also includes a headboard and a rear cross sill.

In another embodiment, a pickup truck cargo box subassembly is disclosed. The pickup truck cargo box subassembly includes a load floor formed of a sandwich structure having an upper skin, a lower skin and a core extending therebetween. The upper skin is formed of a composite material including continuous reinforcing fibers. The pickup truck cargo box subassembly also includes a left inner sidewall panel having a left inner sidewall panel joining channel extending horizontally along at least a portion of a length of the left inner sidewall panel and integrally formed with the left inner sidewall panel. The pickup truck cargo box subassembly also includes a right inner sidewall panel having a right inner sidewall panel joining channel extending horizontally along at least a portion of a length of the right inner sidewall panel and integrally formed with the right inner sidewall panel. The left and right inner sidewall panel joining surfaces join a peripheral portion of the load floor. The pickup truck cargo box subassembly also includes a headboard, a forward cross sill, a center cross sill, and a rear cross sill. The cross sills may be used to attach the cargo box subassembly to the frame.

BRIEF DESCRIPTION OF THE DRAWINGS

FIGS. 6A and 6B depict fragmented, cross sectional views of the right inner sidewall panel shown in FIG. 2 taken along lines 6A-6A and 6B-6B of FIG. 2, respectively.

FIG. 6C depicts a plan view of the reinforcement structures for the joining channel of the right inner sidewall panel shown in FIG. 6B.

FIG. 6D depicts a perspective, cross section view of the reinforcement structures for the joining channel of the right inner sidewall panel shown in FIG. 6C.

FIGS. 8A, 8B and 8C depict fragmented, cross sectional views of the rear cross sills shown in FIGS. 7A, 7B and 7C taken along lines 8A-8A, 8B-8B and 8C-8C, respectively.

DETAILED DESCRIPTION

Figure 1:
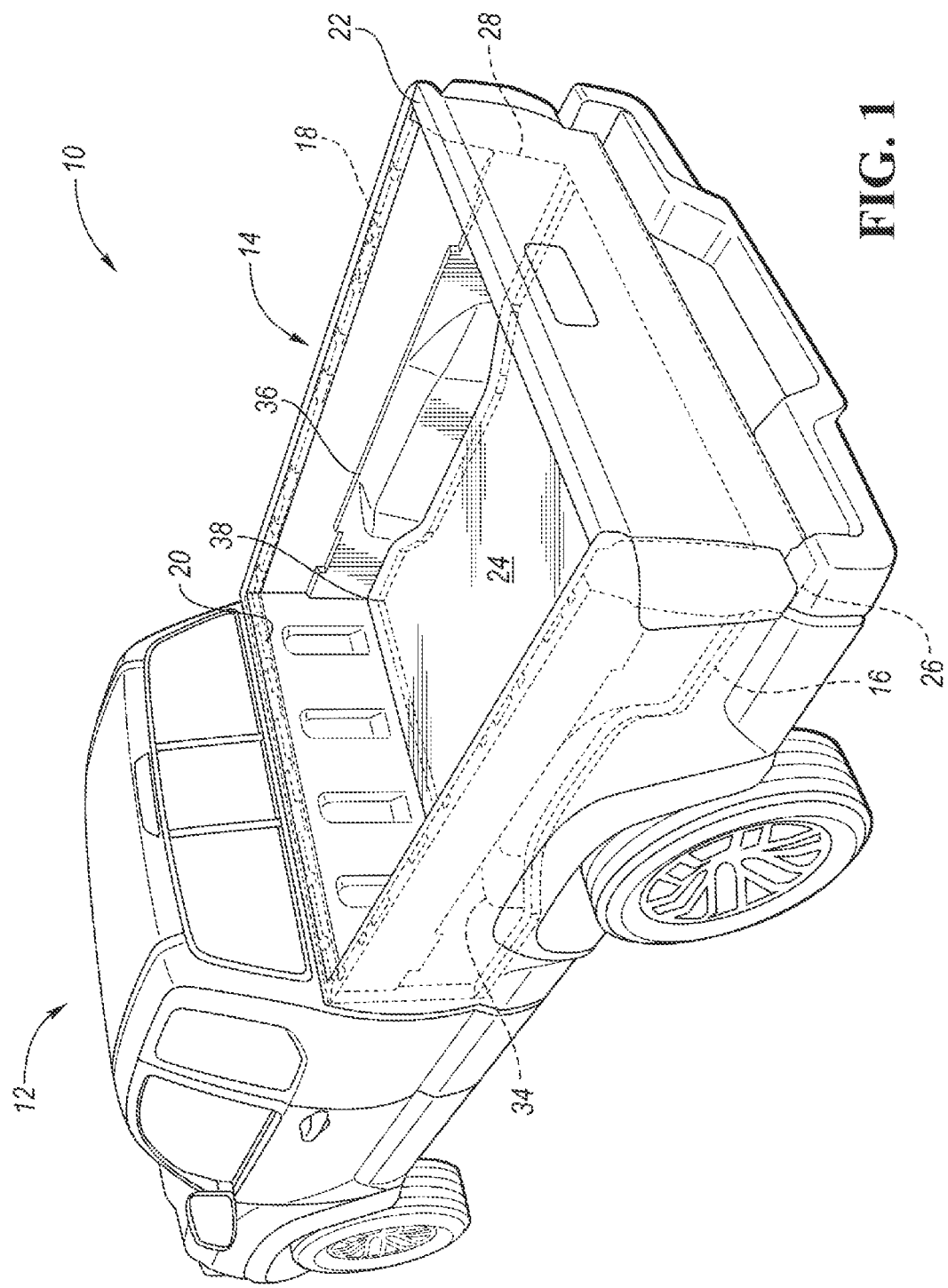
FIG. 1 is a perspective view of a pickup truck including a passenger compartment and a cargo box partially defined by a headboard, a left inner sidewall panel, a right inner sidewall panel, a rear sill and a load floor according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The term "about" may be used herein to describe disclosed or claimed embodiments. The term "about" may modify a value disclosed or claimed in the present disclosure. In such instances, "about" may signify that the value it modifies is within ±0%, 0.1%, 0.5%, 1%, 2%, 3%, 4%, 5% or 10% of the value.

Pickup truck cargo boxes may be constructed from a variety of materials. The traditional and most common material used is steel due to the low piece price of stamped steel components. However, steel grades used for stamping pickup truck cargo box components suffer from being heavier than alternative materials, prone to corrosion, and easily dented. To improve fuel economy and reduce vehicle emissions, aluminum has entered the market as a lower weight alternative to steel. However, the use of aluminum adds significant manufacturing cost, remains prone to corrosion, and is also easily dented. Sheet molding compound (SMC) is a thermoset, chopped fiber reinforced composite plastic that offers a good balance of properties including corrosion resistance and improved dent resistance over metal alternatives at a weight and cost somewhere between steel and aluminum. Carbon fiber is also used in a format like SMC but in a thermoplastic matrix resin such as nylon. The carbon fiber option offers better potential for weight reduction among the group as well as a good balance of properties, but at a significant cost premium to other materials considered.

In practice, a common design approach for the load floor of the truck box may be used with one or more of these material options. The common design approach is based upon achieving adequate structural support for the cargo while facilitating processability of the materials into components. The approach results in a characteristic array of parallel corrugated sections running front-to-back that increase the floor's section modulus and translates into increased load carrying capability but only along the direction of the corrugations. In the transverse (side-to-side) direction such a corrugated floor on its own remains relatively weak and flexible. Consequently, multiple crossmembers in the form of ribs or cross sills or a combination thereof are typically integrated into the underside of the floor structure at multiple points along its length. These elements add height to the overall package space, weight, and cost to the assembly.

Sandwich panels are typically planar structures constructed from a lightweight core material to which structural skins are applied. Section properties can be easily tailored by the thickness of the core and the skins facilitating an optimized balance between strength and stiffness. Sandwich structures are known for their relatively high specific strength and stiffness as compared to other design options, especially for use in relatively flat structures. This high specific performance results in reduced weight and package space and improved isotropy. As the load floor of a pickup truck cargo box, improvements in torsional stiffness, cargo volume, fuel economy, and vehicle handling, are all possible without any reduction in cargo capacity. When structural skins based upon continuous fiber composite laminates are applied, a significant improvement in dent resistance can be achieved over other options. There is a need for a cost-effective method for the incorporation of such sandwich structures into the design of a pickup truck box.

One significant issue with utilizing sandwich structures is how they are incorporated in a structural and durable way to the pickup truck cargo box. The typical truck cargo box load floor includes multiple attachment points utilizing fasteners that may pass through the floor to the pickup truck frame, side walls, or other components. Fasteners are commonly incorporated into sandwich panels. However, certain precautions need to be addressed. Bolt loads can often exceed the compressive strength of the core material, especially when combined with dynamic loads from cargo, and the core can be irreversibly crushed. A common practice is to incorporate a relatively incompressible sleeve through the core, or a localized reinforcement pocket within the sandwich panel to support the clamp load from the fastener. Such a sleeve or localized reinforcement must be pocketed into the sandwich panel, typically using adhesives, to maintain at acceptable levels repeated stresses from eccentric loads passing through the sandwich panel to the joint. This may necessitate the use of many attachment points to distribute the loads and minimize stresses at each joint. In addition, these localized reinforcements must often be applied prior to the lamination of the skins to the core. Therefore, there is no opportunity to mass produce sandwich panels in a continuous or automated lamination process. An alternative process based upon thermoforming has been proposed to create a sandwich load floor structure that incorporates specially located components and/or complex geometry for structure and assembly of the load floor. And, the complex geometry proposed is difficult to thermoform into structures that include continuous reinforcing fibers. The net result is a level of complexity of design and manufacturing cost that may outweigh any advantages. What is needed is a truck cargo box construction in which the load floor may be manufactured as a sandwich panel using a simplified and cost-effective process and at the same time facilitates its incorporation as a load floor into a cargo box subassembly.

In one or more embodiments, a pickup truck cargo box subassembly is disclosed that has a load floor constructed of a sandwich material including a fiber reinforced composite material. In some embodiments, the fiber reinforced composite material is a continuous fiber reinforced composite material. The load floor may be joined to the cargo box without the use of fasteners to support a significant amount of the load experienced by the load floor without significantly deforming the joint. Accordingly, the truck cargo box may be constructed such that the load floor may be manufactured as a sandwich panel using a cost-effective lamination process in which the use of fasteners is not mandated to join the sandwich panel to the truck frame or other mating components.

Figure 2:
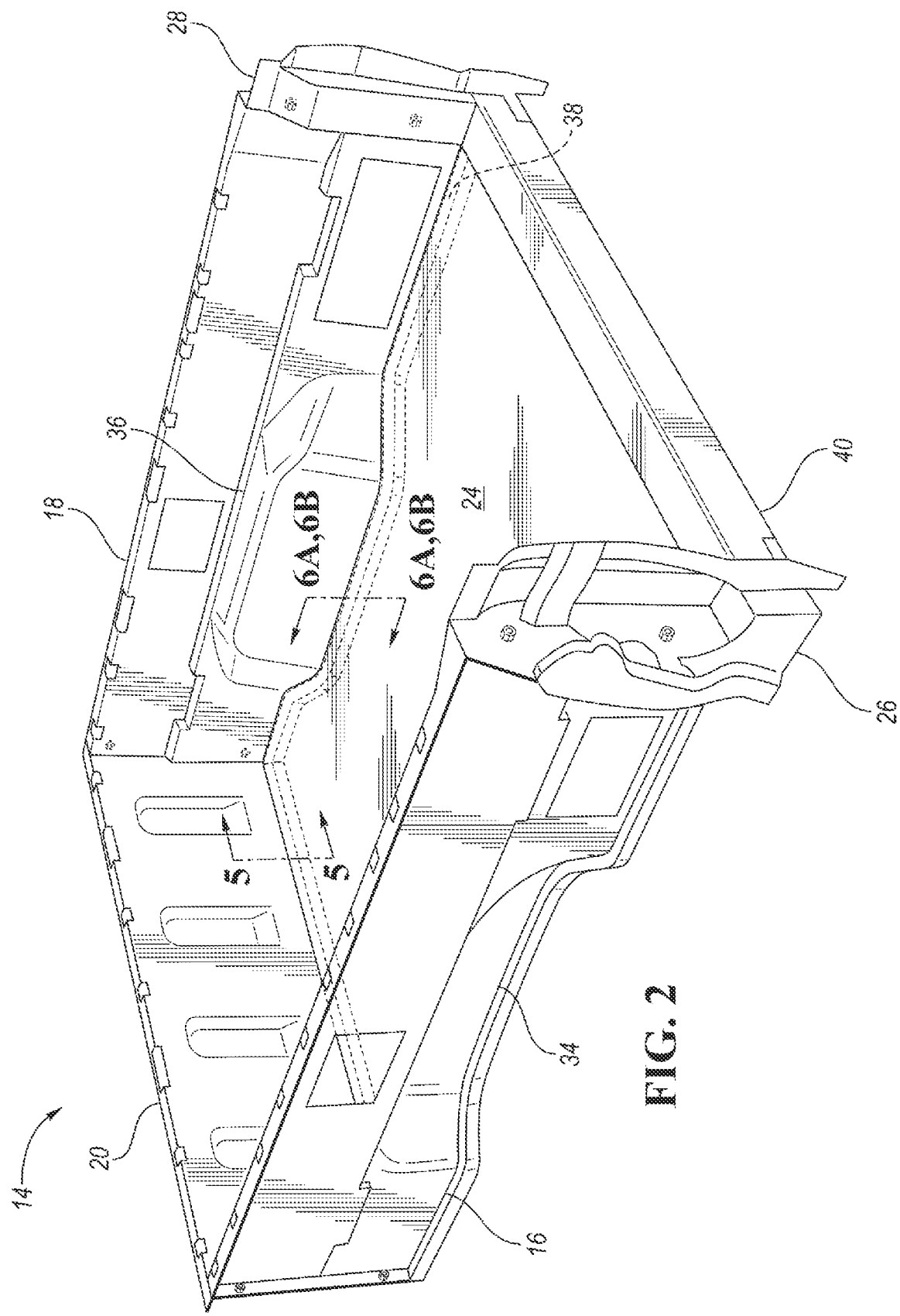
FIG. 2 depicts an isolated, perspective view of the cargo box shown in FIG. 1.
Figure 3:
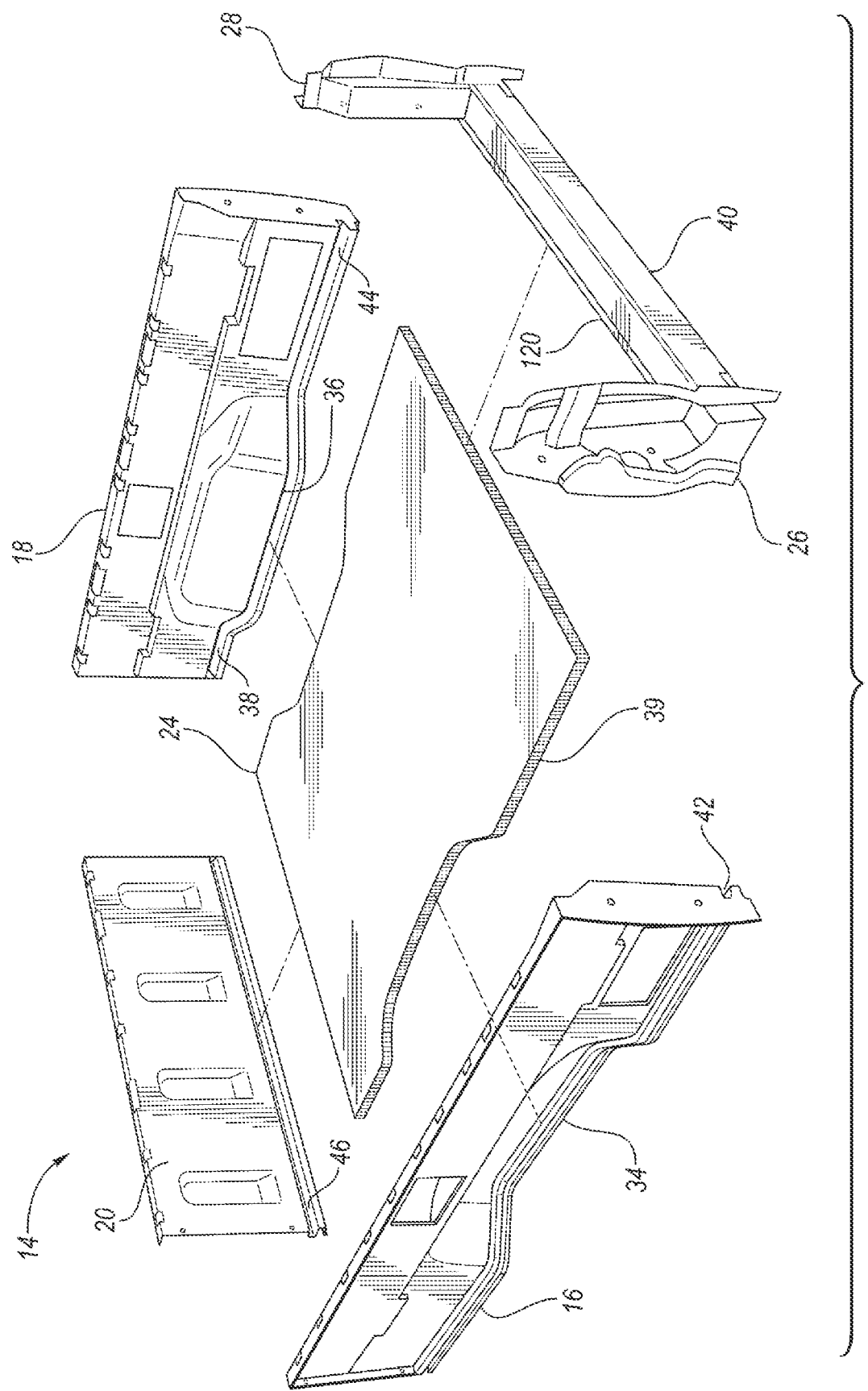
FIG. 3 depicts an exploded, perspective view of a cargo box separately showing the headboard, the left inner sidewall panel, the right inner sidewall panel, a rear cross sill having a trim piece and the load floor.
Figure 4:
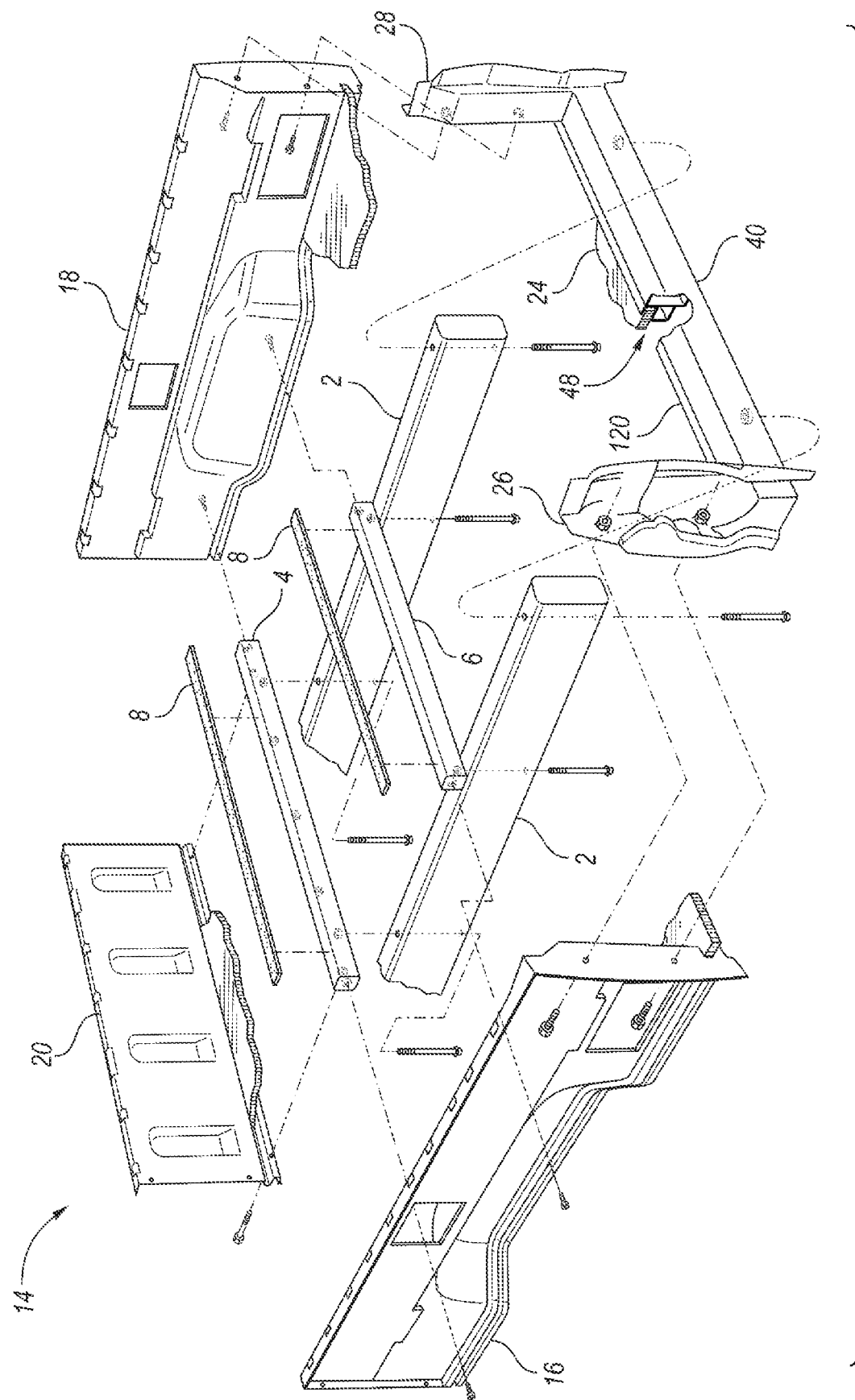
FIG. 4 depicts an exploded, perspective view of the cargo box of FIG. 3 showing the mechanical fastening of the headboard, the left inner sidewall panel, the right inner sidewall panel and the rear cross sill to a vehicle frame and each other, and a partial cut away view of the rear cross sill and the load floor.

FIG. 1 depicts a perspective view of pickup truck 10 including passenger compartment 12 and cargo box 14. FIG. 2 depicts an isolated, perspective view of cargo box 14. FIG. 3 depicts an exploded, perspective view of cargo box 14 separately showing headboard 20, left inner sidewall panel 16, right inner sidewall panel 18, rear cross sill 40 having trim piece 120 and load floor 24. FIG. 4 depicts an exploded, perspective view of cargo box 14 showing the mechanic fastening of headboard 20, left inner sidewall panel 16, right inner sidewall panel 18, rear cross sill 40 to vehicle frame 2 and each other, and a partial cut away view of rear cross sill and load floor 24.

Passenger compartment 12 is configured to accommodate a driver and one or more passengers of pickup truck 10. Passenger compartment 12 is at a forward position of pickup truck 10. Cargo box 14 is partially defined by left inner sidewall panel 16, right inner sidewall panel 18, headboard 20, liftgate 22, and load floor 24. Left inner sidewall 16 and right inner sidewall panel 18 may be joined to headboard 20. Cargo box 14 is configured to receive and store cargo that can be transported using pickup truck 10. Cargo box 14 may be accessed through its open top or through liftgate 22, which is configured to be lowered from closed position (as shown in FIG. 1) to an open position in which liftgate 22 opens outwardly away from cargo box 14 into an open position substantially parallel to load floor 24. Liftgate 22 may be removably securable to left D-pillar 26 and right D-pillar 28 while liftgate 22 is in the closed position. Liftgate 22 may be rotatably secured to left D-pillar 26 and right D-pillar 28 to rotate liftgate 22 from the closed position to the open position and vice versa. Left and right inner sidewall panels 16 and 18 include left and right wheel wells 34 and 36, respectively. Peripheral channel 38 is formed in left inner sidewall panel 16, right inner sidewall panel 18, headboard 20 and/or rear cross sill 40. Peripheral channel 38 is configured to join load floor 24 to left inner sidewall panel 16, right inner sidewall panel 18, headboard 20 and/or rear cross sill 40. Peripheral channel has a joining surface to join the load floor 24 to left inner sidewall panel 16, right inner sidewall panel 18, headboard 20 and/or rear cross sill 40.

FIG. 3 further depicts peripheral channel 38. As shown in FIG. 3, peripheral channel 38 is integrated into inner sidewall panels 16 and 18, headboard 20, and rear cross sill 40. The portion of peripheral channel 38 on left inner sidewall panel 16 is left inner sidewall panel channel 42. The portion of peripheral channel 38 on right inner sidewall panel 18 is right inner sidewall panel channel 44. The portion of peripheral channel 38 on headboard 20 is headboard channel 46. The portion of peripheral channel 38 on rear cross sill 40 is rear cross sill channel 48 (as shown in FIG. 4). In other embodiments, headboard 20 and/or rear cross sill 40 does not include headboard channel 46 and rear cross sill channel 48, respectively.

The assembly of inner sidewall panels 16 and 18, headboard 20, and rear cross sill 40 onto load floor 24 creates a joint around peripheral portion 39 of load floor 24, thereby distributing sidewall and/or cargo loads over a relatively large surface area. Peripheral channel 38 is configured to reinforce the load floor 24 from lateral and/or vertical movement, thereby creating a strong, rigid, and durable subassembly for carrying cargo. Load floor 24 may have an hourglass shape around wheel wells 34 and 36, thereby contributing to lateral stability in the frontward to rearward directions. In other embodiments, the load floor has a rectangular shape or a cut in at the left and right edges for the wheel wells.

In one embodiment, peripheral channel 38 is integrated into inner sidewall panels 16 and 18, headboard 20 and rear cross sill 40 such that peripheral channel 38 runs the entire perimeter of load floor 24. When inner sidewall panels 16 and 18, headboard 20 and rear cross sill 40 are assembled to load floor 24, load floor 24 is joined to peripheral channel 38 at peripheral portion 39 of load floor 24 along the entire perimeter of load floor 24, and peripheral channel 38 captures load floor 24 along its entire perimeter.

In a second embodiment, peripheral channel 38 is integrated into inner sidewall panels 16 and 18, headboard 20 and rear cross sill 40 at various spaced apart regions along load floor 24 in an assembled state. When inner sidewall panels 16 and 18, headboard 20 and rear cross sill 40 are assembled to load floor 24, load floor 24 is joined at the various spaced apart regions along load floor 24, and the various spaced apart regions capture load floor 24 in those regions. The left and right inner sidewall panel channels, the headboard, the rear cross sill and the load floor are configured to create a mechanically interlocking structure.

A shown in FIG. 4, cross member 4 (otherwise referred to as the front cross sill) bolts to vehicle frame 2 with left and right bolts (although other fasteners may be used). The front and/or rear cross sills may be attached to the vehicle frame. The pickup truck cargo box subassembly may be configured to mechanically fasten to the vehicle frame through one or more fasteners and the fasteners do not pass through the load floor in one embodiment. The one or more fasteners may be inserted from below the vehicle frame. Left inner sidewall panel 16 bolts to the left edge surface of cross member 4 with a bolt and right inner sidewall panel 18 bolts to the right edge surface of cross member 4. Headboard 20 bolts to cross member 4 with left and right bolts as shown in FIG. 4. Rear cross sill 40 bolts to vehicle frame 2 with left and right bolts. Left inner sidewall panel 16 bolts to left D-pillar 26 through a flange located on left inner sidewall panel 16 with upper and lower bolts. Right inner sidewall panel 18 bolts to right D-pillar 28 through a flange located on right inner sidewall panel 18 with upper and lower bolts. Frame 2 supports cross members 4 and 6 (otherwise referred to as the central cross sill) configured to support load floor 24. Material 8 may be positioned between cross members 4 and 6 and load floor 24. Material 8 may be formed of a noise, vibration and harshness (NVH) reducing material configured to reduce noise, vibration and harshness between load floor 24 and cross members 4 and 6. Material 8 may also include an adhesive, a mastic, an isolation tape, a fabric, a sealant or a combination thereof. In one embodiment, material 8 may be a heat expandable mastic or adhesive material that can be applied in an uncured form and then expand through the application of heat to occupy the entire volume between load floor 24 and cross members 4 and 6. Material 8 may be applied to the upper surface of cross member 4. Material 8 may also be configured to form a structural bond between load floor 24 and cross members 4 and 6 that facilitates the transfer of load between the components so that each component reinforces the other.

Figure 5:
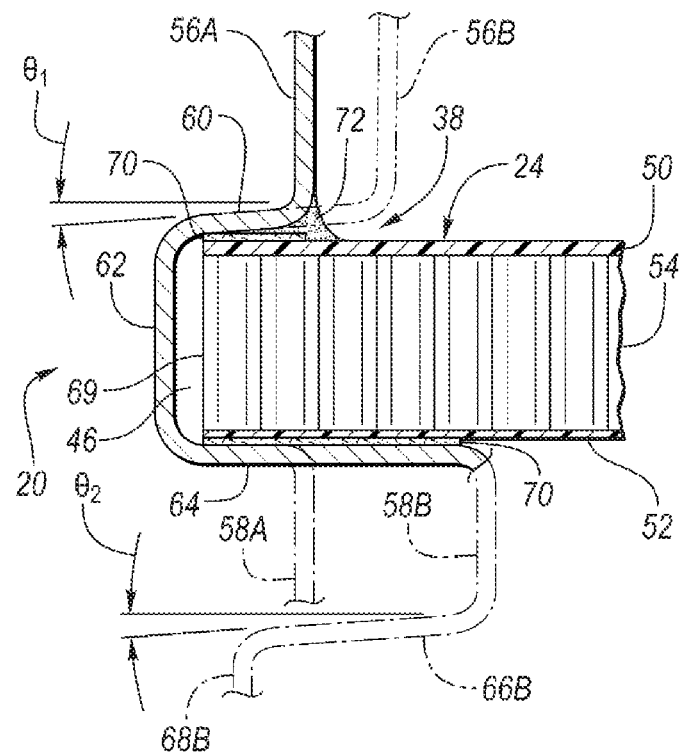
FIG. 5 depicts a fragmented, cross section view of the headboard and the load floor shown in FIG. 2 taken along line 5-5 of FIG. 2.

FIG. 5 depicts a fragmented, cross section view of headboard 20 and load floor 24 shown in FIG. 2 taken along line 5-5. As shown in FIG. 5, load floor 24 is formed of a sandwich material having upper skin 50, lower skin 52, and core 54 extending therebetween. Headboard 20 includes upper vertical wall 56A or 56B, headboard channel 46 and lower vertical wall 58A or 58B. Headboard channel 46 includes upper flange 60, end wall 62 and lower ledge 64. Upper vertical wall 56A or 56B transitions into upper flange 60. Upper flange 60 transitions into end wall 62. End wall 62 transitions into lower ledge 64. Lower ledge 64 transitions into lower vertical wall 58A or 58B. Lower vertical wall 58B transitions into lower flange 66B, which transitions into lower vertical wall 68B. As shown in FIG. 5, in one embodiment, upper vertical wall 56A is aligned with lower vertical wall 58A, thereby making the depth of upper flange 60 and lower ledge 64 equal. In an alternative embodiment, lower vertical wall 58B is forward upper vertical wall 56A or 56B, thereby extending lower ledge 64 beyond upper vertical wall 56A or 56B and away from headboard 20. In another embodiment, upper vertical wall 56B is forward lower vertical wall 58A, thereby extending upper flange beyond lower vertical wall 58A and away from headboard 20.

The load path between load floor 24 and headboard channel 46 depends on the packaging of cargo box 14 and pickup truck frame (not shown). In a first scenario, load floor 24 is loaded on lower ledge 64 of headboard channel 46. In the first scenario, the depth of lower ledge 64 from end wall 62 to lower vertical wall 58B may be configured to distribute cargo box loads of cargo box 14 across a relatively large area. The depth of lower ledge 64 in the first scenario may be any of the following values or in a range of any two of the following values: 1, 2, 3, 4, 5, 10, 15, 20, 25, 30, 35, 40, 45, 50, 55, 60, 65, 70, 75, 80, 85, 90, 95 and 100 millimeters. In the first scenario, lower vertical wall 58B may be reinforced by lower flange 66B and lower vertical wall 68B. In a second scenario, upper flange 60 of headboard channel 46 is loaded on load floor 24. In the second scenario, the depth of upper flange 60 may be configured to distribute the load of headboard 20 across a relatively large area by extending upper flange 60. The depth of upper flange 60 in the second scenario may be any of the following values or in a range of any two of the following values: 1, 2, 3, 4, 5, 10, 15, 20, 25, 30, 35, 40, 45, 50, 55, 60, 65, 70, 75, 80, 85, 90, 95 and 100 millimeters. In one or more embodiments, the minimum depth of end wall 62 to upper vertical wall 56A or 56B and lower vertical wall 58A or 5BB may be configured to constrain load floor 24 against lateral and/or vertical movement and conceal the peripheral edge 69 of load floor 24. The minimum constraining depth may be any of the following values or in a range of any two of the following values: 1, 2, 3, 4, 5, 10, 15, 20, 25, 30, 35, 40, 45, 50, 55, 60, 65, 70, 75, 80, 85, 90, 95 and 100 millimeters.

As shown in FIG. 5, material 70 is disposed between upper flange 60 and load floor 24 and between lower ledge 64 and load floor 24. Material 70 may be formed of an NVH reducing material configured to reduce noise, vibration and harshness within the joint formed between peripheral channel 38 and load floor 24. Material 70 may also include an adhesive, a mastic, an isolation tape, a fabric, a sealant or a combination thereof. In one embodiment, material 70 may be a heat expandable mastic or adhesive material that can be applied in an uncured form and then expand through the application of heat to occupy the entire volume between load floor 24 and upper flange 60 and lower ledge 64. Material 70 may also be configured to form a structural bond between load floor 24 and upper flange 60 and lower ledge 64. The opening created between upper skin 50 and the bend between upper vertical wall 56A or 56B and upper flange 60 may be filled with a sealant 72.

As shown in FIG. 5, headboard 20 is formed from a metal stamping. Upper flange 60 is angled at a first relief angle ($\theta_1$) and lower flange 66B is angled at a second relief angle ($\theta_2$) to facilitate the metal stamping process and enhance formability. The first relief angle ($\theta_1$) may be any of the following values or in a range of any two of the following values: 0, 1, 2, 3, 4, 5, 6, 7, 8, 9, 10, 15, 20, 25 and 30 degrees. The second relief angle ($\theta_2$) may be any of the following values or in a range of any two of the following values: 0, 1, 2, 3, 4, 5, 6, 7, 8, 9, 10, 15, 20, 25 and 30 degrees. Lower ledge 64 may be angled relative to end wall 62 at a relief angle similar to those identified above to facilitate the stamping process and enhance formability. In other embodiments, the headboard may be formed or molded from a composite plastic material including reinforcing fibers. The molded upper and lower flanges may have first and second relief angles similar or the same as the metal stamping to facilitate the molding process and enhance moldability.

Figure 6A:
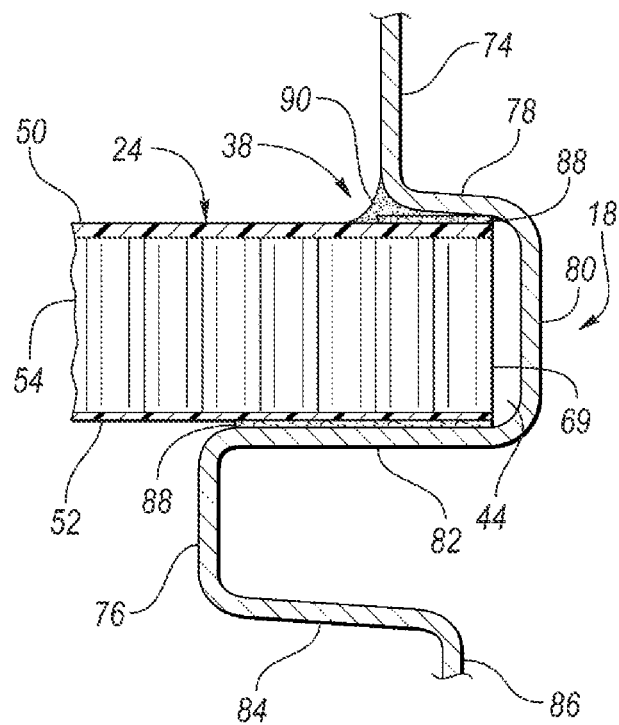

FIG. 6A depicts a fragmented, cross sectional view of right wheel well 36 of right inner sidewall panel 18 taken along line 6A-6A of FIG. 2. In FIG. 6A, right inner sidewall panel 18 is formed from a metal stamping. FIG. 6B depicts a fragmented, cross sectional view of right wheel well 36 of right inner sidewall panel 18 taken along line 6B-6B of FIG. 2. The relief angle description relating to headboard 20 (whether made from metal or plastic) applies to FIGS. 6A and 6B. The description of FIGS. 6A and 6B relating to right wheel well 36 and right inner sidewall panel 18 applies to the peripheral channel and/or peripheral channel portions integrated into left wheel well 34 and left inner sidewall panel 16.

As shown in FIG. 6A, load floor 24 is formed of a sandwich material having upper skin 50, lower skin 52, and core 54 extending therebetween. Right inner sidewall panel 18 includes upper vertical wall 74, right inner sidewall panel channel 44 and lower vertical wall 76. Right inner sidewall panel channel 44 includes upper flange 78, end wall 80 and lower ledge 82. Upper vertical wall 74 transitions into upper flange 78. Upper flange 78 transitions into end wall 80. End wall 80 transitions into lower ledge 82. Lower ledge 82 transitions into lower vertical wall 76. Lower vertical wall 76 transitions into lower flange 84, which transitions into lower vertical wall 86. As shown in FIGS. 6A and 6B, in one embodiment, lower vertical wall 76 is forward upper vertical wall 74, thereby extending lower ledge 82 beyond upper vertical wall 74 and away from right inner sidewall panel 18.

The load path between load floor 24 and right inner sidewall panel channel 44 depends on the packaging of cargo box 14 and pickup truck frame (not shown). In a first scenario, load floor 24 is loaded on lower ledge 82 of right inner sidewall panel channel 44. In the first scenario, the depth of lower ledge 82 from end wall 80 to lower vertical wall 76 may be configured to distribute cargo box loads of cargo box 14 across a relatively large area by extending lower ledge 82. The depth of lower ledge 82 in the first scenario may be any of the following values or in a range of any two of the following values: 1, 2, 3, 4, 5, 10, 15, 20, 25, 30, 35, 40, 45, 50, 55, 60, 65, 70, 75, 80, 85, 90, 95 and 100 millimeters.

Lower vertical wall 76 may be reinforced by lower flange 84 and lower vertical wall 86. Lower vertical wall 76 may be further reinforced ribbing 92 as shown in FIGS. 6B, 6C and 6D. In certain applications, upper flange 78 and lower ledge 82 may tend to bow out relative to end wall 80. Reinforcement structure 94 may be included and configured to vertically reinforce upper flange 78 and lower ledge 82 such that it mitigates this tendency.

In a second scenario, upper flange 78 of right inner sidewall panel channel 44 is loaded on load floor 24. In the second scenario, the depth of upper flange 78 may be configured to distribute the load of right inner sidewall panel 18 across a relatively large area by extending upper flange 78. The depth of upper flange 78 in the second scenario may be any of the following values or in a range of any two of the following values: 1, 2, 3, 4, 5, 10, 15, 20, 25, 30, 35, 40, 45, 50, 55, 60, 65, 70, 75, 80, 85, 90, 95 and 100 millimeters. In one or more embodiments, the minimum depth of end wall 80 to upper vertical wall 74 and lower vertical wall 76 may be configured to reinforce load floor 24 against lateral and/or vertical movement and conceal the peripheral edge 69 of load floor 24. The minimum constraining depth may be any of the following values or in a range of any two of the following values: 1, 2, 3, 4, 5, 10, 15, 20, 25, 30, 35, 40, 45, 50, 55, 60, 65, 70, 75, 80, 85, 90, 95 and 100 millimeters.

As shown in FIGS. 6A and 6B, material 88 is disposed between upper flange 78 and load floor 24 and between lower ledge 82 and load floor 24. Material 88 may be formed of an NVH reducing material configured to reduce noise, vibration and harshness within the joint formed between peripheral channel 38 and load floor 24. Material 88 may also include an adhesive, a mastic, an isolation tape, a fabric, a sealant or a combination thereof. In one embodiment, material 88 may be a heat expandable mastic or adhesive material that can be applied in an uncured form and then expand through the application of heat to occupy the entire volume between load floor 24 and upper flange 78 and lower ledge 82. Material 88 may also be configured to form a structural bond between load floor 24 and upper flange 78 and lower ledge 82. The opening created between upper skin 50 and the bend between upper vertical wall 74 and upper flange 78 may be filled with a sealant 90.

Figure 7A:
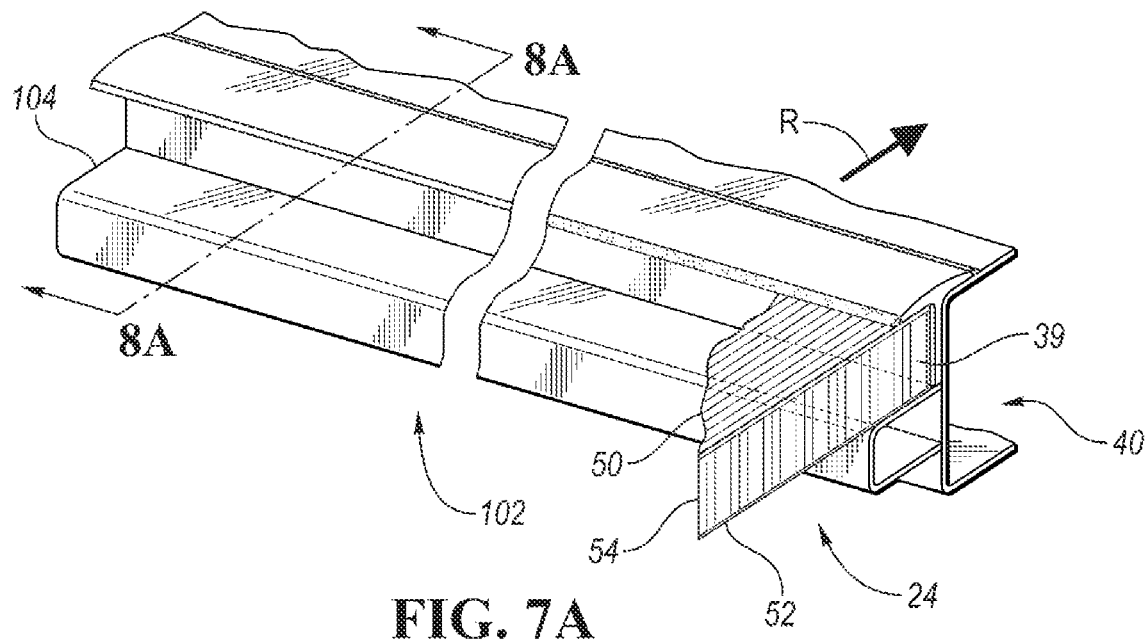
FIG. 7A is an isolated, perspective view of the rear cross sill of FIG. 2 joining the load floor of FIG. 2 and showing an insert protecting the edge of the load floor.
Figure 8A:
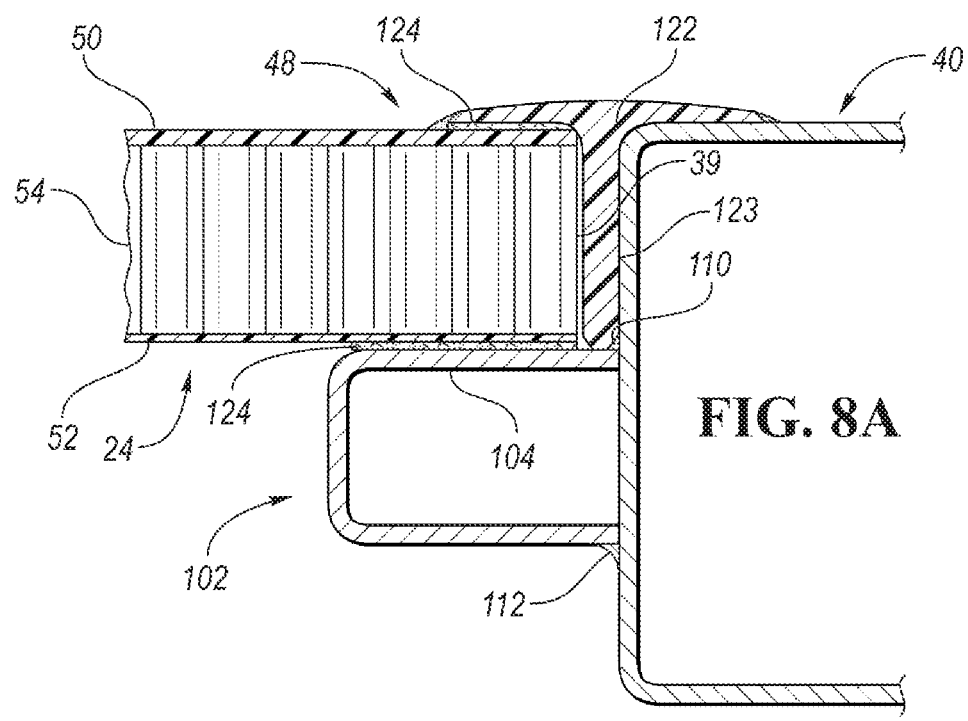

As shown in FIG. 7A, rear cross sill 40 is shown joining a portion of peripheral portion 39 of load floor 24. FIG. 8A depicts a fragmented, cross sectional view of rear cross sill 40 joining peripheral portion 39 of load floor 24. In FIGS. 7A and 8A, rear cross sill 40 is formed of an assembly of metal components. In other embodiments, the rear cross sill may be formed of a molded composite material including reinforcing fibers such as continuous reinforcing fibers. Beam 102 includes lower ledge 104. Beam 102 is welded to rear cross sill 40 through upper and lower seam welds 110 and 112.

Insert 122 has a T-shaped cross section. Insert 122 may be an extruded or formed plastic. In other embodiments, the insert may be formed of a metal material. An adhesive may be used to secure wall 123 of insert 122 to rear cross sill 40. The terminal end of wall 123 may be flush relative to lower ledge 104 to reinforce insert 122 against loads that it may experience. In other embodiments, insert 122 may be installed using mechanical fasteners.

As shown in FIG. 8A, material 124 is disposed between insert 122 and load floor 24 and between lower ledge 104 and load floor 24. Material 124 may be formed of an NVH reducing material configured to reduce noise, vibration and harshness within the joint formed between rear cross sill channel 48 and load floor 24. Material 124 may also include an adhesive, a mastic, an isolation tape, a fabric, a sealant or a combination thereof. In one embodiment, material 124 may be a heat expandable mastic or adhesive material that can be applied in an uncured form and then expand through the application of heat to occupy the entire volume between load floor 24 and lower ledge 104 and insert 122. Material 124 may also be configured to form a structural bond between load floor 24 and lower ledge 104 and insert 122.

Figure 7B:
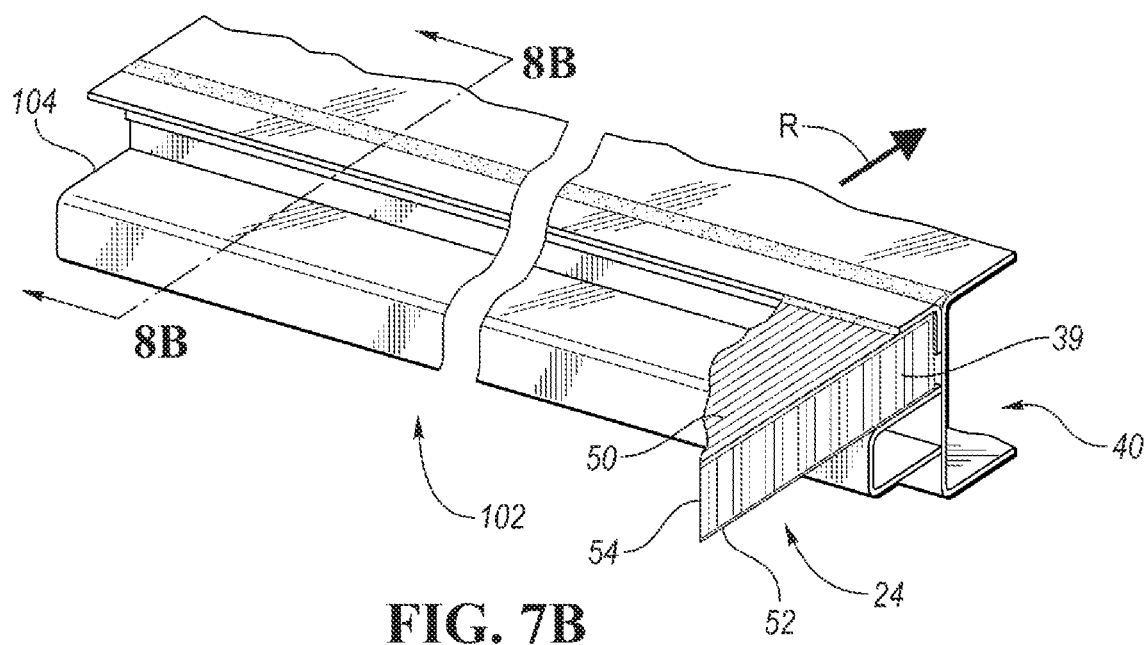
FIG. 7B is an isolated, perspective view of the rear cross sill of FIG. 3 joining the load floor of FIG. 3.
Figure 8B:
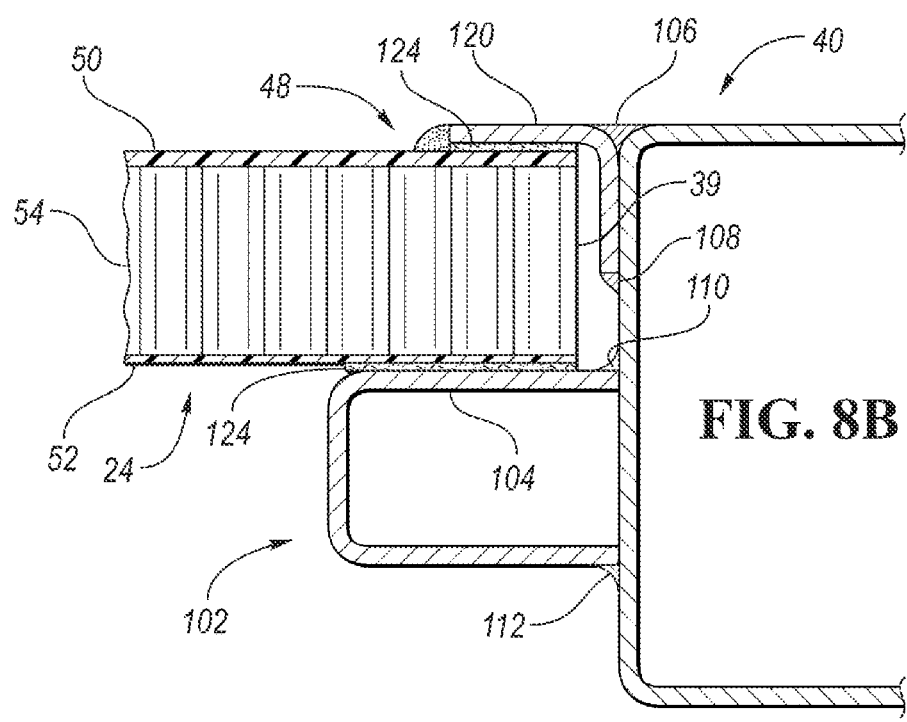

As shown in FIG. 7B, rear cross sill 40 is shown joining a portion of peripheral portion 39 of load floor 24. FIG. 8B depicts a fragmented, cross sectional view of rear cross sill 40 joining peripheral portion 39 of load floor 24. In FIGS. 7B and 8B, rear cross sill 40 is formed of an assembly of metal components. In other embodiments, the rear cross sill may be formed of a molded composite material including reinforcing fibers such as continuous reinforcing fibers. Beam 102 includes lower ledge 104. Beam 102 is welded to rear cross sill 40 through upper and lower seam welds 110 and 112.

As shown in FIG. 7B, beam 102 extends the length of rear cross sill 40. In another embodiment, as shown in FIG. 7D, the rear cross sill includes three spaced apart beam portions 114, 116 and 118. In other embodiments, there may be more than three spaced apart brackets. This spaced apart configuration may also be used for left inner sidewall panel channel 42, right inner sidewall panel channel 44 and/or headboard channel 46.

As shown in FIGS. 7B and 8B, the load floor 24 is loaded on lower ledge 104. The depth of lower ledge 104 from vertical wall 108 may be configured to distribute cargo box loads of cargo box 14 across a relatively large area. The depth of lower ledge 104 may be any of the following values or in a range of any two of the following values: 1, 2, 3, 4, 5, 10, 15, 20, 25, 30, 35, 40, 45, 50, 55, 60, 65, 70, 75, 80, 85, 90, 95 and 100 millimeters. Trim piece 120 may be welded in place or installed after load floor 24 is loaded on beam 102. Trim piece 120 may be welded to rear cross sill 40 through upper and lower seam welds 106 and 108. Trim piece 120 is formed of metal. In other embodiments, the trim piece may be an extruded or formed plastic.

As shown in FIG. 8B, material 124 is disposed between trim piece 120 and load floor 24 and between lower ledge 104 and load floor 24. Material 124 may be formed of an NVH reducing material configured to reduce noise, vibration and harshness within the joint formed between rear cross sill channel 48 and load floor 24. Material 124 may also include an adhesive, a mastic, an isolation tape, a fabric, a sealant or a combination thereof. In one embodiment, material 124 may be a heat expandable mastic or adhesive material that can be applied in an uncured form and then expand through the application of heat to occupy the entire volume between load floor 24 and lower ledge 104 and trim piece 120. Material 124 may also be configured to form a structural bond between load floor 24 and lower ledge 104 and trim piece 120.

Figure 7C:
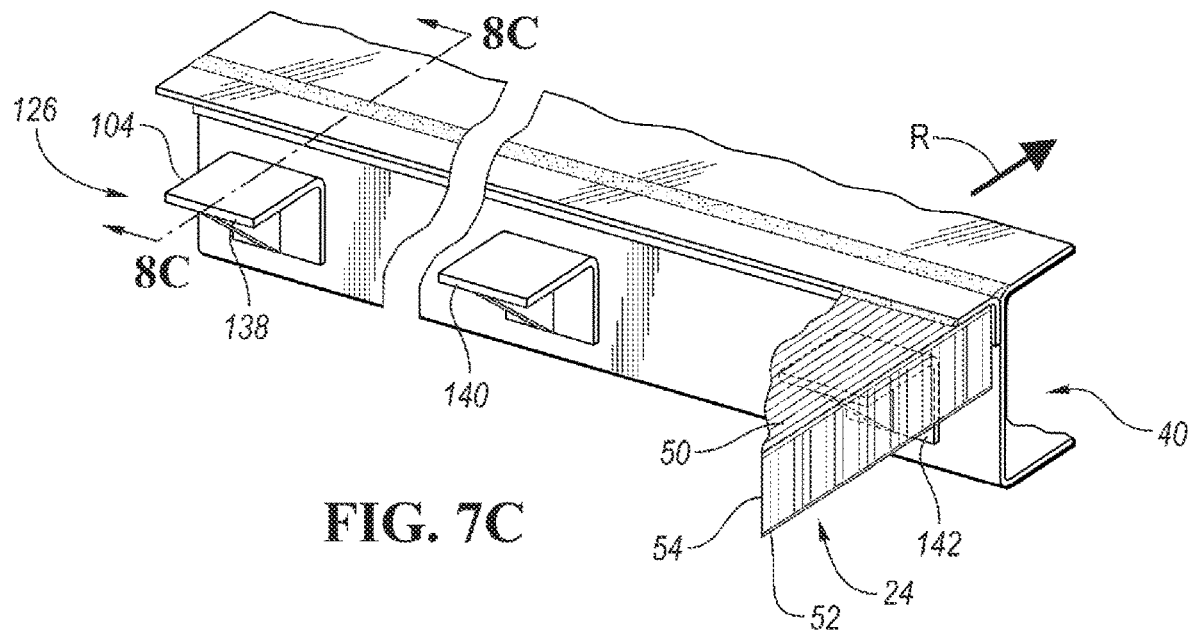
FIG. 7C is an isolated, perspective view of an alternative rear cross sill according to another embodiment joining the load floor of FIG. 2.
Figure 7D:
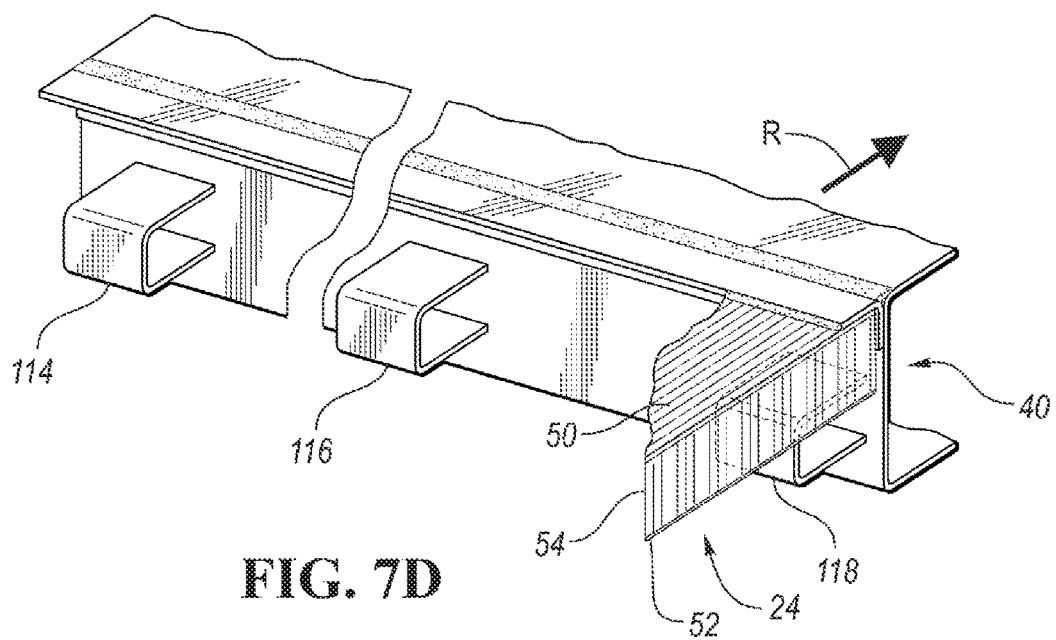
FIG. 7D is an isolated, perspective view of yet another alternative rear cross sill joining the load floor of FIG. 2.

As shown in FIG. 7C, rear cross sill 40 is shown joining a portion of peripheral portion 39 of load floor 24. FIG. 8C depicts a fragmented, cross sectional view of rear cross sill 40 joining peripheral portion 39 of load floor 24. In FIGS. 7C and 8C, rear cross sill 40 is formed of an assembly of metal components. In other embodiments, the rear cross sill may be formed of a molded composite material including reinforcing fibers such as continuous reinforcing fibers. Bracket 126 includes lower ledge 104 and vertical wall 130. Bracket 126 is reinforced by gusset 132. Bracket 126 is welded to rear cross sill 40 through upper and lower seam welds 134 and 136. As shown in FIG. 7C, bracket 126 includes three spaced apart bracket portions 138, 140 and 142. In other embodiments, there may be more than three spaced apart brackets. In another embodiment, bracket 126 extends the length of rear cross sill 40.

As shown in FIGS. 7C and 8C, the load floor 24 is loaded on lower ledge 104. The depth of lower ledge 104 from vertical wall 108 may be configured to distribute cargo box loads of cargo box 14 across a relatively large area. The depth of lower ledge 104 may be any of the following values or in a range of any two of the following values: 1, 2, 3, 4, 5, 10, 15, 20, 25, 30, 35, 40, 45, 50, 55, 60, 65, 70, 75, 80, 85, 90, 95 and 100 millimeters. Trim piece 120 may be welded in place or installed after load floor 24 is loaded on bracket 126. Trim piece 120 may be welded to rear cross sill 40 through upper and lower seam welds 106 and 108. Trim piece 120 may also be an integral feature of the rear sill either through forming, assembly with fasteners, or welding.

As shown in FIG. 8C, material 124 is disposed between trim piece 120 and load floor 24 and between lower ledge 104 and load floor 24. Material 124 may be formed of an NVH reducing material configured to reduce noise, vibration and harshness within the joint formed between rear cross sill channel 48 and load floor 24. Material 124 may also include an adhesive, a mastic, an isolation tape, a fabric, a sealant or a combination thereof. In one embodiment, material 124 may be a heat expandable mastic or adhesive material that can be applied in an uncured form and then expand through the application of heat to occupy the entire volume between load floor 24 and lower ledge 104 and trim piece 120. Material 124 may also be configured to form a structural bond between load floor 24 and lower ledge 104 and trim piece 120.

In another embodiment, trim piece 120 is not utilized and upper skin 50 is mounted flush (e.g. the same elevation) or below flush (e.g. a lower elevation) with the upper portion of rear cross sill 40 and optionally finished with a sealant.

In another embodiment, the load floor 24 is mounted on top of the rear cross sill 40 and a separate trim piece encloses peripheral portion 39 along its rear edge.

The embodiments shown may also include geometry for the channeling of water away from the interior of the truck cargo box to the exterior of the truck cargo box. In addition to the rear cross sill, other crossmembers may be included to facilitate assembly and/or support of the floor.

Figure 9:
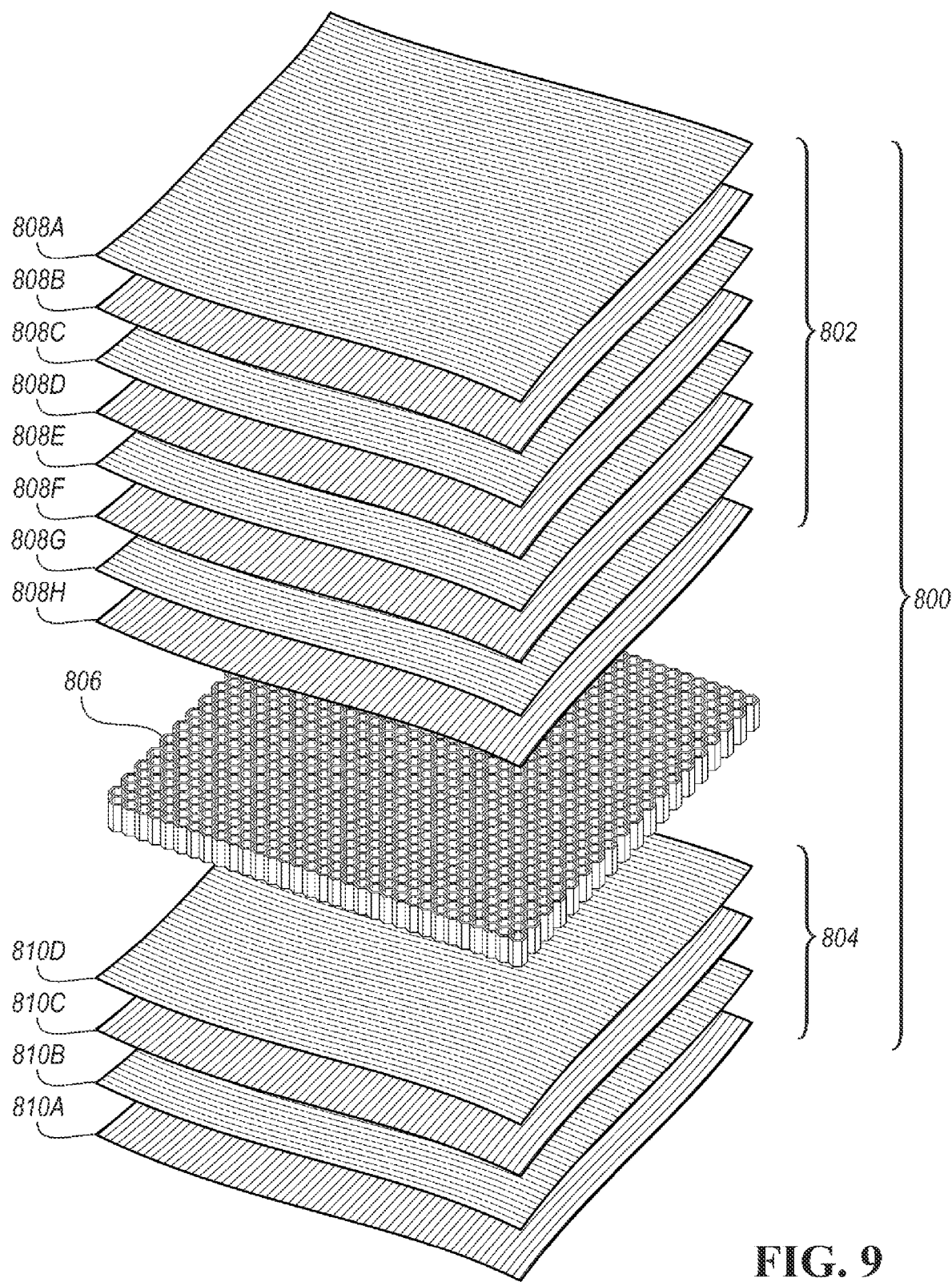
FIG. 9 is an exploded, perspective view of a sandwich structure for a pickup truck cargo box floor according to an embodiment.

FIG. 9 is an exploded, perspective view of sandwich structure 800 configured to be used as a load floor of a cargo box of a pickup truck. Sandwich structure 800 includes upper skin 802, lower skin 804, and core 806 extending therebetween. As shown in FIG. 9, upper skin 802 and lower skin 804 are each illustrated as a number of laminated plies of thermoplastic composite tape reinforced by continuous, unidirectional strands of fibers, such as glass, carbon fiber or a combination thereof. Upper skin 802 is formed of eight (8) laminated plies 808A through 808H. Lower skin 804 is formed of four (4) laminated plies 810A through 810D. In one embodiment, each ply orients unidirectional fibers in a direction such that the assembled plies (e.g. the laminate) provide strength in two or more directions. Non-limiting factors, such as the amount of fiber within the plies, the thickness of the plies, the orientation of the plies, the number of plies and/or the total thickness of the laminate strongly influence the strength, stiffness, and/or impact properties of the laminated skins and the sandwich structure. Upper skin 802 and lower skin 804 may be produced from woven or stitched fabrics that may incorporate multiple directions of reinforcing fibers within the same ply or between separate plies. Multiple plies of different constructions and fibers may be combined to create a range of different upper and lower skins and sandwich structures. Other materials that can be produced as a sheet, such as steel, aluminum, and alloys thereof, may be used as the material for upper and lower skins.

As shown in FIG. 9, core 806 of sandwich structure 800 is illustrated as a honeycomb-like array, which results in one of the most weight efficient designs for a core while maintaining requisite strength. Core 806 is configured to maintain a constant distance between upper and lower skins 802 and 804 during use as part of a pickup truck cargo area. In one or more embodiments, the core material may include a syntactic foam in which a resin is filled with low density fillers or an expanded foam. The core material may also be straws assembled into a honeycomb-like array, metal stampings, plastic moldings, and/or extruded or roll-formed profiles that maintain separation between the upper and lower skins. The core may also be a honeycomb structure produced from paper, metal, resin impregnated fiber mats and plastics.

The pickup truck cargo box sandwich structure may be subjected to a wide range of temperatures during use. This temperature range may be an important criterion in the selection of the materials (e.g. resins) used for the composite skins, the core material, and any adhesives applied to bond the composite skins to the core material. The low end of the temperature range may extend to −20, −30, −40, −50 and −60° C. whereas the high end of the temperature range may extend to 50, 60, 70, 80, 90 and 100° C. The presence of continuous reinforcing strands of fibers within an impregnating matrix resin of the composite plies contributes significantly to their mechanical properties across the pickup truck cargo box temperature range, thereby enhancing the toughness of the skins against impact while at the same time enabling the skins to withstand permanent deformation under cargo loads as temperature extremes are reached during the course of a day under exposure to different climates. Core materials utilizing resins (e.g. plastics) may typically include fillers and/or additives and may include discontinuous fibers. However, more cost-effective production methods for producing a honeycomb core may not be readily adaptable to the inclusion of reinforcing fibers. In certain instances, a resin is selected for the core that meets the structural demands of the application across the pickup truck cargo box temperature range while resisting permanent deformation at higher temperatures within the range without the need to incorporate reinforcing fibers.

Heat distortion temperature (HDT) (also known as Deflection Temperature under Load (DTUL)) measures the temperature at which a plastic material specimen deflects under constant load. Standards governing this measurement include ASTM D648 and ISO 75, each of which include methodologies for testing at stress levels of 0.45 MPa and 1.8 MPa. For plastic or resin based core materials, in one or more embodiments, a material is selected with a minimum HDT when measured at 0.45 MPa and 1.8 MPa in some instances when exceeding the upper temperature range for the cargo box such as 50, 60, 70, 80, 90 and 100° C.

Skins 802 and 804 may be bonded to core 806 using a continuous or discontinuous process. An adhesive layer may be applied between each of skin 802 and 804 and core 806 and the adhesive sets during the bonding process forming a structural bond. The adhesive may be a thermoplastic material, a thermoset material, or a combination thereof. The adhesive may be activated by elevating the temperature of the adhesive above a predetermined activation temperature. Alternatively, other curing mechanisms may also be involved such as moisture cure, UV cure, etc. A thermoplastic-based adhesive may soften at an application temperature well above its HDT or glass transition temperature and become tacky to itself and its mating surfaces. Cooling the thermoplastic based adhesive below its HDT or glass transition temperature forms a structural bond between the components. A thermoset-based adhesive may be initially tacky at some application temperature and subjected to elevated temperature to induce rapid curing at an activation temperature. A reactive hot melt adhesive may involve application at an elevated temperature to melt the adhesive followed by cooling, similar to a thermoplastic adhesive, with the addition of a reactive, moisture cure phase to develop additional strength. In one or more embodiments, the application temperature and activation temperatures are below the HDT of the mating component. For example, an application or activation temperature above the HDT of the core material may result in collapse of the core when pressure is applied during the bonding process. In addition, the HDT of the adhesive should be compatible with the upper operating temperature of the cargo box.

In an embodiment in which skins 802 and 804 and core 806 are both produced from a compatible thermoplastic resin, skins 802 and 804 can be heat bonded to core 806 by melting each skin 802 and 804 sufficiently to promote a bond with core 806 without adhesives. The mating surfaces of the core may also require the application of heat to create a layer of melted resin to match those on the skins. Bonding of skins 802 and 804 to core 806 can be conducted as a lamination process and can be conducted on a continuous basis resulting in a very favorable economics. Such a continuous lamination process can utilize a double belt laminator (press). Bonding can also happen at once or in a batch process. In either case, a profile of pressure, temperature and time is applied to control, in part, the heat affected zone of the core during bonding to minimize any crush and loss of the core that may occur.

As shown in FIG. 9, upper skin 802 includes eight (8) plies 808A through 808H and lower skin 804 includes four (4) plies 810A through 810D. Plies 808A through 808H are brought together in a lamination process to form upper skin 802. Plies 810A through 810D are brought together in a lamination process to form lower skin 804. The number of plies used in an upper skin may be any of the following values or in a range of any two of the following values: 1, 2, 3, 4, 5, 6, 7, 8, 9, 10, 11, 12, 15, 20, 25 and 30. The number of plies used in a lower skin may be any of the following values or in a range of any two of the following values: 1, 2, 3, 4, 5, 6, 7, 8, 9, 10, 11, 12, 15, 20, 25 and 30. In one embodiment, the upper and lower skins include plies of a thermoplastic resin matrix reinforced by continuous strands of glass fibers, each ply oriented in a direction tailored to maximize performance. As depicted in one embodiment, the orientation of the fibers in each ply in the upper skin from the uppermost ply to the lowermost ply alternate between about 0 degrees and 90 degrees. The orientation of the fibers in each ply in the lower skin from the lowermost ply to the uppermost ply may alternate between 0 degrees and 90 degrees. The upper and lower skins could also be assembled from other configurations such as a quasi-isotropic layup where the reinforcing fibers are oriented relative to each other at 0 degrees, 90 degrees, and +/−45 degrees. When assembled from organosheet produced from braided textile fabrics, the number of skins for a quasi-isotropic layup could be done with a single ply/skin. The weight fraction of fibers in the composite material may be about any of the following values or in a range of any two of the following values: 40%, 45%, 50%, 55%, 60%, 65%, 70%, 75% and 80%.

Each ply 808A through 808H of upper skin 802 has a thickness of 0.25 mm. Therefore, the overall thickness of upper skin 802 is 2 mm. The thickness of each ply of the upper skin may be any of the following values or in a range of any two of the following values: 0.1, 0.2, 0.3, 0.4, 0.5, 1, 2, 3, 4, 5 and 6 mm. Each ply of the upper skin may have the same thickness or varied thickness. The upper skin, as applied to a load floor of a pickup truck cargo box, is subjected to severe direct impact from the loading of cargo. The upper skin may be thicker than the lower skin, which is not exposed to such extreme impact conditions. The total thickness of the upper skin may be any of the following values or in a range of any two of the following values: 0.5, 1, 1.5, 2, 2.5, 3, 3.5, 4, 5, 6, 7, 8, 9 and 0 mm. Each ply 810A through 810D of lower skin 804 has a thickness of 0.25 mm. Therefore, the overall thickness of lower skin 804 is 1 mm. The thickness of each ply of the lower skin may be any of the following values or in a range of any two of the following values: 0.1, 0.2, 0.3, 0.4, 0.5, 1, 2, 3, 4, 5 and 6 mm. Each ply of the lower skin may have the same thickness or varied thickness. The total thickness of the lower skin may be any of the following values or in a range of any two of the following values: 0.5, 1, 1.5, 2, 2.5, 3, 3.5, 4, 5, 6, 7, 8, 9 and 10 mm. The ratio of thickness of the upper skin to the lower skin may be any of the following values or in a range of any two of the following values: 0.5:1, 1:1, 1.5:1, 2:1, 2.5:1 and 3:1.

Core 806 may have a honeycomb or honeycomb-like structure. Core 806 may be formed of a resin material that is compatible with heat bonding to the upper and lower skins 802 and 804 to avoid the cost of adhesive plies.

Upper skin 802 may include a protective and/or cosmetic surface layer applied to the outer surface of the outermost ply of upper skin 802 to protect it against ultraviolet (UV) exposure, chemical exposure, abrasion, impact, and/or provide a uniform, aesthetic appearance. The coefficient of friction of the surface of the upper skin 802 may also be tailored by such the protective and/or cosmetic surface layer to control the sliding of cargo across the load floor. The protective and/or cosmetic layer may be a spray in bed liner, paint, film and/or an assembled bed liner in special colors and textures.

Figure 10A:
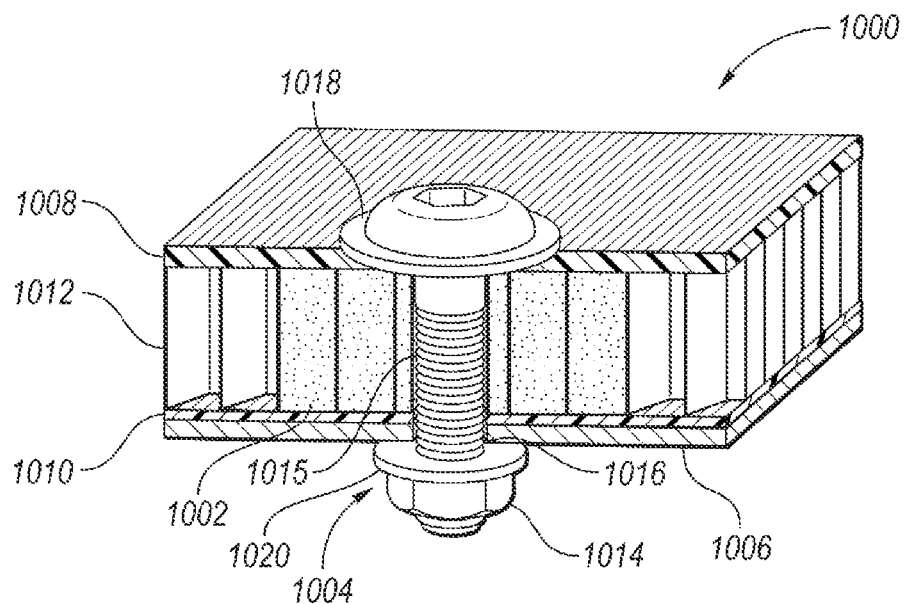
FIG. 10A is a partial cross section, perspective view of a prior art sandwich structure including a reinforcement structure and a fastener configured to join the sandwich structure to a component, such as a cargo box frame.

FIG. 10A is a partial cross section, perspective view of a prior art sandwich structure 1000 including reinforcement structure 1002 and fastener 1004 configured to join sandwich structure 1000 to component 1006. Sandwich structure 1000 includes upper skin 1008, lower skin 1010 and core 1012 extending therebetween. A region surrounding fastener 1004, which includes honeycomb cells of core 1012, has reinforcement structure 1002. Reinforcement structure 1002 is formed by filling the honeycomb cells with a potting compound or resin that is cured to create a solid zone configured to support a clamp load from fastener 1004 and any eccentric loads supported by the joint formed between sandwich structure 1000 and component 1006 through fastener 1004. As shown in FIG. 10A, fastener 1004 is a pan head bolt configured to join sandwich structure 1000 and component 1006 through aperture 1015 formed in reinforcement structure 1002 (and apertures (not shown) formed through upper skin 1008, lower skin 1010 and component 1006) by tightening nut 1014 onto screw threads 1016 of fastener 1004. Washer 1018 may be integrated into the pan head of fastener 1004. Washer 1020 may be integrated with nut 1014. Washers 1018 and/or 1020 may be configured to support and distribute loads experienced by the joint. Component 1006 may be a portion of a pickup truck cargo box frame.

Figure 10B:
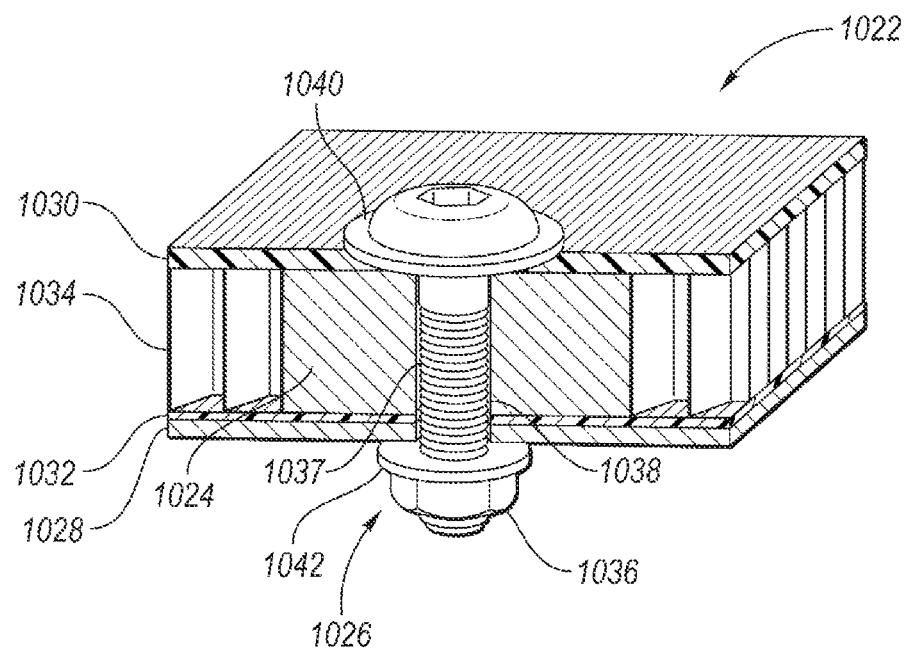
FIG. 10B is a partial cross section, perspective view of a prior art sandwich structure including a reinforcement structure and a fastener configured to join the sandwich structure to a component, such as a cargo box frame.

FIG. 10B is a partial cross section, perspective view of a prior art sandwich structure 1022 including reinforcement structure 1024 configured to join sandwich structure 1022 to component 1028. Sandwich structure 1022 includes upper skin 1030, lower skin 1032 and core 1034 extending therebetween. A region of sandwich structure 1022 is removed to accommodate reinforcement structure 1024, which is formed of a solid insert. Reinforcement structure 1024 may be formed of an aluminum alloy or other metal material. Reinforcement structure 1024 is adhesively bonded within the removed region of sandwich structure 1022. Reinforcement structure 1024 is configured to support a clamp load from fastener 1026 and any eccentric loads supported by the joint formed between sandwich structure 1022 and component 1028 through fastener 1026. As shown in FIG. 10B, fastener 1026 is a pan head bolt configured to join sandwich panel 1022 and component 1028 through aperture 1037 formed in reinforcement structure 1024 (and apertures (not shown) formed through upper skin 1030, lower skin 1032 and component 1028) by tightening nut 1036 onto screw threads 1038 of fastener 1026. Washer 1040 may be integrated into the pan head of fastener 1026. Washer 1042 may be integrated with nut 1036. Washers 1040 and/or 1042 may be configured to support and distribute loads experienced by the joint. Component 1028 may be a portion of a pickup truck cargo box frame.

Figure 10C:
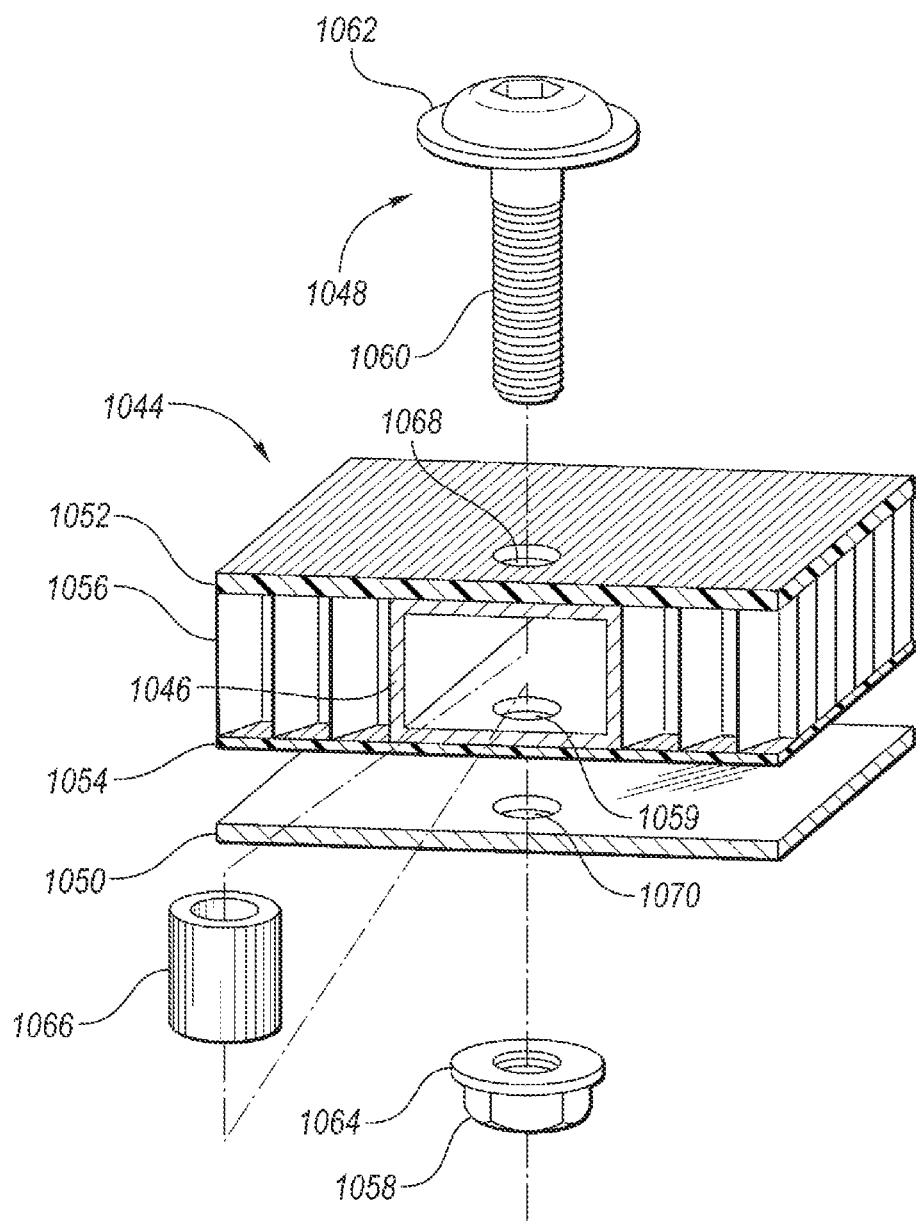
FIG. 10C is a partial cross section, perspective exploded view of a prior art sandwich structure including a reinforcement structure and a fastener configured to join the sandwich structure to a component, such as a cargo box frame.

FIG. 10C is a partial cross section, perspective view of a prior art sandwich structure 1044 including reinforcement structure 1046 configured to join sandwich structure 1044 to component 1050. Sandwich structure 1044 includes upper skin 1052, lower skin 1054 and core 1056 extending therebetween. A region of sandwich structure 1044 is removed to accommodate reinforcement structure 1046, which is formed of a hollow insert. Reinforcement structure 1046 may be formed of a steel or other metal material. The outer surface of reinforcement structure 1046 is adhesively bonded within the removed region of sandwich structure 1044. Reinforcement structure 1046 is configured to support a clamp load from fastener 1048 and any eccentric loads supported by the joint formed between sandwich structure 1044 and component 1050 through fastener 1048. As shown in FIG. 10C, fastener 1048 is a pan head bolt configured to join sandwich panel 1044 and component 1050 through aperture 1059 formed in reinforcement structure 1046 (and apertures 1068 and 1070 formed through upper skin 1052 and component 1050, respectively, and an aperture (not shown) formed through lower skin 1054) by tightening nut 1058 onto screw threads 1060 of fastener 1048. Washer 1062 may be integrated into the pan head of fastener 1048. Washer 1064 may be integrated with nut 1058. Washers 1062 and 1064 may be configured to support and distribute loads experienced by the joint. Spacer 1066 may be configured to support and distribute loads experienced by the joint, including reinforcement structure 1046. Component 1050 may be a portion of a pickup truck cargo box frame.

As can be seen from FIGS. 10A, 10B and 10C, reinforcement structures 1002, 1024 and 1046 require installation in advance of a lamination process that bonds skins 1008 and 1010, skins 1030 and 1032, and skins 1052 and 1054, respectively, to core 1012, 1034 and 1056, respectively. Installation requires precisely locating the potting compound or inserts of reinforcement structures 1002, 1024 and 1046 so that apertures 1015, 1037 and 1059, respectively, can be later drilled through the exact locations after the skins 1008 and 1010, skins 1030 and 1032, and skins 1052 and 1054, respectively, have been applied, and may preclude a continuous, automated manufacturing process. Even if such installations are managed after the lamination of the skins, extensive cost, weight, and complexity are added. Significant time may also be required to facilitate curing of the potting compound or resin utilized to bond the inserts to the sandwich structure.

In one or more embodiments, the assembly approach of joining the load floor to the inner sidewall panels and optionally the headboard and/or the rear cross sill eliminates the necessity to integrate complex and expensive fastening methods into the sandwich structure and eliminates the necessity to finish the exposed edges of the honeycomb panel while delivering significant weight and space savings as well as performance enhancements. The core of the peripheral portion of the load floor may be uninterruptedly extending without the use of any fasteners. The core may be formed of a regularly repeating structure. The core of the peripheral portion of the load floor maintains the regularly repeating structure by virtue of no fasteners being used in the peripheral portion.

In an embodiment of this disclosure, a peripheral portion of the load floor made from a sandwich structure is supported by channels formed in the left and right inner sidewall panels, and optionally the headboard and rear cross sill that join the peripheral portion without the necessity of bolted or fastened joints (although such bolted or fastened joints may be additionally utilized for attaching components such as rails, sidewalls and/or tie downs) through the load floor to support a substantial amount of any eccentric loads supported by the joint. The sandwich structure may optionally have one or more fasteners joining the sandwich structure to one or more components of the pickup truck cargo box subassembly. In one or more embodiments, the skins may be laminated in-line with production of the core in a continuous process, thereby achieving enough economic advantage to support the use of a sandwich panel commercially.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A pickup truck cargo box subassembly comprising:
a load floor composed of a sandwich structure having an upper skin, a lower skin and a core extending therebetween, the upper skin is formed of a composite material including continuous reinforcing fibers;
a left inner sidewall panel having a left inner sidewall panel joining channel extending horizontally along at least a portion of a length of the left inner sidewall panel;
a right inner sidewall panel having a right inner sidewall panel joining channel extending horizontally along at least a portion of a length of the right inner sidewall panel;
a headboard; and
a rear cross sill,
the left and right inner sidewall panel joining channels joining a peripheral portion of the load floor.

2. The subassembly of claim 1, wherein the headboard includes a headboard joining surface molded or stamped into the headboard.

3. The subassembly of claim 1, wherein the rear cross sill includes a rear cross sill joining surface.

4. The subassembly of claim 1, wherein the left and right inner sidewall panel channels are molded or stamped into the left and right inner sidewall panels, respectively.

5. The subassembly of claim 1, wherein the left inner sidewall panel channel includes a left upper flange and a left lower ledge, and the right inner sidewall panel channel includes a right upper flange and a right lower ledge.

6. The subassembly of claim 5, wherein the left inner sidewall panel channel includes a left end wall and the right inner sidewall panel channel includes a right end wall.

7. The subassembly of claim 6, wherein a material is situated between the sandwich structure and the left upper flange, lower ledge and/or end wall, and the material is situated between the sandwich panel and the right upper flange, lower ledge and/or end wall, the material is a noise, vibration and harshness (NVH) reducing material, an adhesive, a mastic, an isolation tape, a fabric, a sealant or a combination thereof.

8. The subassembly of claim 7, wherein the material is the adhesive, the adhesive configured to form a structural bond between the sandwich structure and the left upper flange, lower ledge and/or end wall and between the sandwich panel and the right upper flange, lower ledge and/or end wall.

9. The subassembly of claim 1, wherein the left and right inner sidewall panel channels, the headboard, the rear cross sill and the load floor are configured to create a mechanically interlocking structure.

10. The subassembly of claim 1, wherein each of the left and right inner sidewall panel joining channels includes first and second joining channel portions spaced apart from each other.

11. The subassembly of claim 1, wherein each of the upper and lower skins are composed of a plurality of plies joined through a lamination process to create each of the upper and lower skins.

12. The subassembly of claim 1, wherein the upper skin is thicker than the lower skin.

13. The subassembly of claim 1, wherein the upper skin has a protective surface layer.

14. The subassembly of claim 1, wherein the left and right inner sidewall panels include left and right wheel wells, and the load floor is configured to wrap around the left and right wheel wells.

15. The subassembly of claim 1, wherein the core of the peripheral portion of the load floor is uninterruptedly extending.

16. The subassembly of claim 1, wherein the core is formed of a regularly repeating structure and the core of the peripheral portion of the load floor maintains the regularly repeating structure.

17. The subassembly of claim 1, further comprising a front cross sill.

18. The subassembly of claim 17, wherein the front and rear cross sills are attached to a vehicle frame.

19. The subassembly of claim 18, wherein the subassembly is configured to mechanically fasten to a vehicle frame through one or more fasteners inserted from below the load floor.

20. The subassembly of claim 17, wherein a material is situated between the front cross sill and the sandwich structure, the material is a noise, vibration and harshness (NVH) reducing material, an adhesive, a mastic, an isolation tape, a fabric, a sealant or a combination thereof.

21. The subassembly of claim 17, further comprising a central cross sill positioned between the front and rear cross sills fastened to a vehicle frame and configured to support the sandwich structure.

22. The subassembly of claim 21, wherein a material is situated between the central cross sill and the sandwich structure, the material is a noise, vibration and harshness (NVH) reducing material, an adhesive, a mastic, an isolation tape, a fabric, a sealant or a combination thereof.

23. The subassembly of claim 22, wherein the material is the adhesive, the adhesive is configured to form a structural bond between the central cross sill and the sandwich structure.

24. The subassembly of claim 17, wherein the headboard is mechanically fastened and/or adhesively bonded to the front cross sill.

25. The subassembly of claim 17, wherein the left inner sidewall panel is mechanically fastened and/or adhesively bonded to the front cross sill and the right inner sidewall panel is mechanically fastened and/or adhesively bonded to the front cross sill.

26. A pickup truck cargo box subassembly comprising:
a load floor composed of a sandwich structure;
left and right inner sidewall panels, each connected to the load floor;
a headboard; and
one or more sills configured to mechanically fasten to a vehicle frame through one or more fasteners configured to not pass through the load floor.

27. The subassembly of claim 26, wherein the left and right inner sidewall panels include left and right inner sidewall panel channels, respectively.

28. The subassembly of claim 26, wherein a material is situated between the one of the one or more sills and the sandwich structure, the material is a noise, vibration and harshness (NVH) reducing material, an adhesive, a mastic, an isolation tape, a fabric, a sealant or a combination thereof.

29. The subassembly of claim 26, wherein the sandwich structure is composed of an upper skin, a lower skin and core extending therebetween and the core is based upon a resin having a heat distortion temperature (HDT) of 50° C. or greater at a stress level of 0.45 MPa.

30. A pickup truck cargo box subassembly comprising:
a load floor composed of a sandwich structure having an upper skin, a lower skin and a core extending therebetween, the core is based upon a resin having a heat distortion temperature (HDT) of 50° C. or greater at a stress level of 0.45 MPa;
a left inner sidewall panel having a left inner sidewall panel joining channel extending horizontally along at least a portion of a length of the left inner sidewall panel;
a right inner sidewall panel having a right inner sidewall panel joining channel extending horizontally along at least a portion of a length of the right inner sidewall panel;
a headboard; and
a rear cross sill,
the left and right inner sidewall panel joining channels joining a peripheral portion of the load floor.

31. The subassembly of claim 30, wherein the core is heat bonded to the upper and/or lower skins without using an adhesive.

32. The subassembly of claim 30, wherein the core is bonded to the upper and/or lower skins using an adhesive.

33. The subassembly of claim 32, wherein the adhesive has an HDT of 50° C. or greater at a stress level of 0.45 MPa and an application and/or activation temperature less than the HDT of the core.

* * * * *